(12) United States Patent
Shin et al.

(10) Patent No.: US 10,956,734 B2
(45) Date of Patent: Mar. 23, 2021

(54) ELECTRONIC DEVICE PROVIDING IRIS RECOGNITION BASED ON PROXIMITY AND OPERATING METHOD THEREOF

(71) Applicant: Samsung Electronics Co., Ltd., Gyeonggi-do (KR)

(72) Inventors: Hyung-Woo Shin, Seoul (KR); Hyemi Lee, Seoul (KR); Hyung Min Lee, Seoul (KR)

(73) Assignee: Samsung Electronics Co., Ltd

( * ) Notice: Subject to any disclaimer, the term of this patent is extended or adjusted under 35 U.S.C. 154(b) by 198 days.

(21) Appl. No.: 15/645,586

(22) Filed: Jul. 10, 2017

(65) Prior Publication Data

US 2018/0012070 A1 Jan. 11, 2018

(30) Foreign Application Priority Data

Jul. 8, 2016 (KR) .................. 10-2016-0086849

(51) Int. Cl.
*G06K 9/00* (2006.01)
*G06K 9/20* (2006.01)
*H04N 5/33* (2006.01)

(52) U.S. Cl.
CPC ..... *G06K 9/00604* (2013.01); *G06K 9/00597* (2013.01); *G06K 9/00617* (2013.01);
(Continued)

(58) Field of Classification Search
CPC ........... G06K 9/00597; G06K 9/00604; G06K 9/00617; G06K 9/00892; G06K 9/00912; G06K 9/2027; H04N 5/33
See application file for complete search history.

(56) References Cited

U.S. PATENT DOCUMENTS

2008/0199165 A1  8/2008  Ng et al.
2008/0277601 A1  11/2008  Phinney et al.
(Continued)

FOREIGN PATENT DOCUMENTS

JP   2006280938   10/2006
JP   2014142851    8/2014
(Continued)

OTHER PUBLICATIONS

Gong et al. ("Handheld System Design for Dual-Eye Multispectral Iris Capture With One Camera," IEEE Transactions on Systems, Man, and Cybernetics: Systems, vol. 43, Issue: 5, Sep. 2013) (Year: 2013).*

(Continued)

*Primary Examiner* — Yubin Hung
(74) *Attorney, Agent, or Firm* — The Farrell Law Firm, P.C.

(57) ABSTRACT

An electronic device and a method of operating the electronic device are provided. The electronic device includes a proximity detector; an iris recognition module; a memory; and a processor electrically connected to the proximity detector, the iris recognition module, and the memory, wherein the processor is configured to execute an iris recognition operation based on the iris recognition module; determine proximity of an object based on the proximity detector while the iris recognition operation is performed; and, if the proximity of the object includes within a set reference range, stop the iris recognition operation.

14 Claims, 14 Drawing Sheets

(52) U.S. Cl.
CPC ..... *G06K 9/00892* (2013.01); *G06K 9/00912*
(2013.01); *G06K 9/2027* (2013.01); *H04N*
*5/33* (2013.01)

(56) References Cited

U.S. PATENT DOCUMENTS

| | | | | |
|---|---|---|---|---|
| 2010/0121636 | A1* | 5/2010 | Burke | G10L 15/265 |
| | | | | 704/233 |
| 2011/0102345 | A1* | 5/2011 | Kim | G06F 3/0414 |
| | | | | 345/173 |
| 2011/0148752 | A1* | 6/2011 | Alameh | G06F 1/1694 |
| | | | | 345/156 |
| 2012/0071149 | A1* | 3/2012 | Bandyopadhyay ... | G06F 1/1643 |
| | | | | 455/418 |
| 2012/0172085 | A1* | 7/2012 | Vuppu | G06F 3/0488 |
| | | | | 455/556.1 |
| 2012/0293629 | A1* | 11/2012 | Min | G06K 9/00604 |
| | | | | 348/46 |
| 2013/0088584 | A1* | 4/2013 | Malhas | G06K 9/00604 |
| | | | | 348/78 |
| 2013/0293457 | A1* | 11/2013 | Yoon | G06F 3/013 |
| | | | | 345/156 |
| 2015/0071503 | A1* | 3/2015 | Prabhakar | G06K 9/0061 |
| | | | | 382/117 |
| 2015/0242696 | A1 | 8/2015 | Kim et al. | |
| 2015/0256741 | A1* | 9/2015 | Towal | H04N 5/23219 |
| | | | | 348/222.1 |
| 2015/0278248 | A1* | 10/2015 | Chen | G06F 16/5838 |
| | | | | 382/118 |
| 2015/0301796 | A1* | 10/2015 | Visser | G06F 3/167 |
| | | | | 715/728 |
| 2016/0139662 | A1 | 5/2016 | Dabhade | |
| 2016/0283789 | A1* | 9/2016 | Slaby | G06K 9/00604 |
| 2017/0017842 | A1 | 1/2017 | Ma et al. | |
| 2017/0277950 | A1 | 9/2017 | Sung et al. | |

FOREIGN PATENT DOCUMENTS

| | | |
|---|---|---|
| KR | 1020150117883 | 10/2015 |
| KR | 20160044403 | 4/2016 |
| WO | WO2011049371 | 4/2011 |
| WO | WO 2015/113479 | 8/2015 |
| WO | WO 2016/035901 | 3/2016 |
| WO | WO 2016/080716 | 5/2016 |

OTHER PUBLICATIONS

International Search Report dated Oct. 20, 2017 issued in counterpart application No. PCT/KR2017/007310, 9 pages.
Chunquan Gan et al., "An Embedded Self-adaptive Iris Image Acquisition System in a Large Working Volume", XP047384283, Nov. 16, 2013, 9 pages.
European Search Report dated Jun. 17, 2019 issued in counterpart application No. 17824585.8-1207, 10 pages.
Au Examination Report dated Aug. 9, 2019 issued in counterpart application No. 2017293746, 3 pages.
AU Notice of Acceptance dated Dec. 11, 2019 issued in counterpart application No. 2017293746, 3 pages.
European Search Report dated Jan. 27, 2021 issued in counterpart application No. 17824585.8-1207, 5 pages.

* cited by examiner

ELECTRONIC DEVICE PROVIDING IRIS RECOGNITION BASED ON PROXIMITY AND OPERATING METHOD THEREOF

PRIORITY

This application claims priority under 35 U.S.C. § 119(a) to a Korean Patent Application filed on Jul. 8, 2016 in the Korean Intellectual Property Office and assigned Serial No. 10-2016-0086849, the entire contents of which are incorporated herein by reference.

BACKGROUND

1. Field of the Disclosure

The present disclosure relates generally to a method and an apparatus for controlling an operation of an electronic device, and more particularly, to a method and an apparatus for controlling an operation of an electronic device based on a proximity of a user to the electronic device.

2. Description of the Related Art

With the recent enhancement of digital technology, various types of electronic devices, such as mobile communication terminals, smart phones, tablet personal computers (PCs), electronic schedulers, notebooks, personal digital assistant (PDAs), wearable devices, or the like, are widely used.

Electronic devices may be implemented in the form of a multimedia player provided with complex functions. For example, electronic devices may provide a telephony function such as voice communication and video communication, a message sending and receiving function such as a short message service (SMS)/multimedia messaging service (MMS) and email, an electronic scheduler function, a photography function, a broadcast reproduction function, a video replay function, a music replay function, an Internet function, a messenger function, a game function, a social networking service (SNS), or the like. Users are able to communicate through the Internet, transmit a facsimile, or manage a variety of personal information using electronic devices.

An electronic device may store large amounts of personal or business data, and various securing means have been devised to prevent users other than the user of the electronic device from reading the data stored in the electronic device. In addition, in recent years, various kinds of business are conducted in electronic devices by operating over the Internet, and various applications are used based on the Internet to perform financial transactions or electronic commerce (e-commerce) and use the Internet.

Therefore, various securing means have been developed to secure an application which requires authority to access an electronic device or user authentication to prevent other users from accessing the electronic device. For example, as current securing means in electronic devices, various authentication methods such as a pattern authentication method, a password (for example, a personal identification number (PIN)) authentication method, a fingerprint authentication method, or an iris authentication method are variously used. In particular, in recent years, service and use of security functions using an iris authentication method is increasing to strengthen security.

In the case of an iris authentication method, an electronic device continuously emits specific light (for example, a light emitting diode (LED) to recognize an iris). However, when this light is exposed to user's eyes at a close distance, user's eye strain may increase and the light may harmfully affect the user's eyes and may cause amblyopia, dry eye, and bloodshot eyes.

SUMMARY

An aspect of the present disclosure provides a method and an apparatus for providing an iris recognition function based on sensed proximity in an electronic device.

Another aspect of the present disclosure provides a method and an apparatus for performing iris recognition according to the proximity of a user in an electronic device.

Another aspect of the present disclosure provides a method and an apparatus for identifying proximity of a user during an iris recognition operation, and adaptively stopping and guiding the iris recognition operation according to the proximity of the user in an electronic device.

Another aspect of the present disclosure provides a non-transitory computer readable recording medium that includes a program recorded thereon, for executing the above-described method in a processor.

According to an aspect of the present disclosure, an electronic device is provided. The electronic device includes a proximity detector; an iris recognition module; a memory; and a processor electrically connected to the proximity detector, the iris recognition module, and the memory, wherein the processor is configured to execute an iris recognition operation based on the iris recognition module; determine proximity of an object based on the proximity detector while the iris recognition operation is performed; and, if the proximity of the object is within a set reference range, stop the iris recognition operation.

According to another aspect of the present disclosure, a method of operating an electronic device is provided. The method includes executing an iris recognition operation based on an iris recognition module; determining proximity of an object based on a proximity detector while the iris recognition operation is performed; and if the proximity of the object is within a set reference range, stopping the iris recognition operation.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
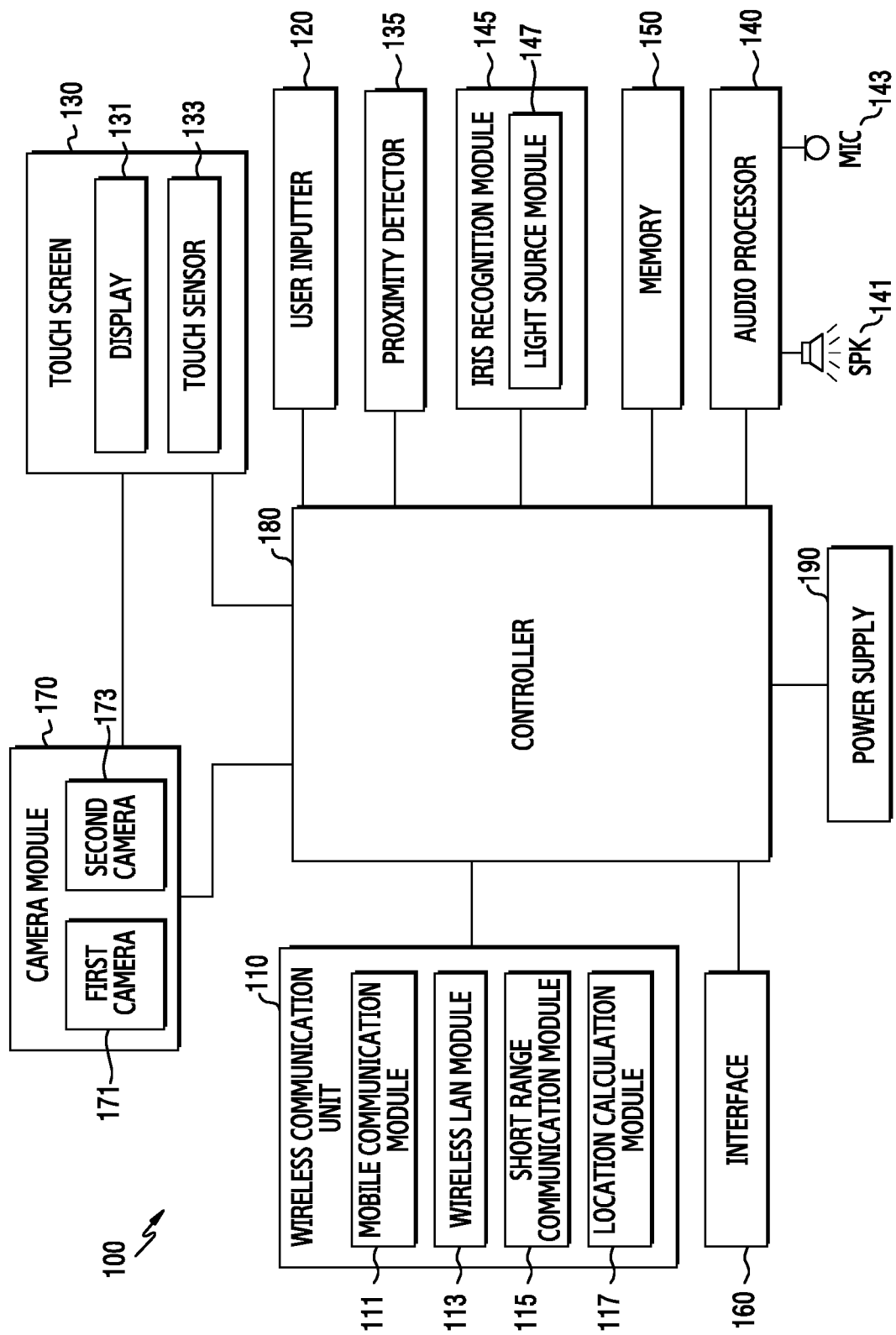
FIG. 1 is a block diagram of an electronic device according to an embodiment of the present disclosure.

Various embodiments of the present disclosure are described herein below with reference to the accompanying drawings. However, embodiments and terms used herein are not intended to limit the technical features described in the present disclosure to specific embodiments, but are intended to be construed as including modifications, equivalents and/or alternatives of embodiments of the present disclosure. In the description of the accompanying drawings, similar reference numerals are used for similar elements. In addition, embodiments of the present disclosure are suggested for explanation and understanding of the technical features disclosed herein but are not intended to limit the scope of the present disclosure. Accordingly, the scope of the present disclosure is defined by the appended claims and their equivalents.

Various embodiments of the present disclosure relate to an electronic device which provides an iris recognition function and an operating method thereof. For example, the electronic device may include one or more detection devices for determining proximity of a user. The electronic device may identify the proximity of the user based on the detection device during the iris recognition operation. The electronic device may continue to perform the iris recognition operation or may automatically stop the iris recognition operation and output a relevant guide according to the proximity of the user. The user can protect the user's eyes based on the proximity of the user if performing the iris authentication using the electronic device.

According to an embodiment of the present disclosure, an electronic device may include all types of devices using one or more of various processors, such as an application processor (AP), a communication processor (CP), a graphics processing unit (GPU), and a central processing unit (CPU). The electronic device may include all information and communication devices, multimedia devices, wearable devices, Internet of Things (IoT) devices, and application devices therefor, which include a detection device for determining proximity of a user (for example, a proximity sensor, an infrared sensor, or the like), and an authentication device for iris recognition (for example, an iris scan sensor, a light source module, an infrared camera, or the like).

The electronic device according to an embodiment of the present disclosure may include at least one of, for example, smartphones, tablet PCs, mobile phones, video telephones, electronic book readers, laptop PCs, netbook computers, PDAs, portable multimedia players (PMPs), moving picture experts group (MPEG-1 or MPEG-2) audio layer 3 (MP3) players, mobile medical devices, or cameras. According to an embodiment of the present disclosure, the electronic devices may include at least one of, for example, televisions (TVs), digital versatile disc (DVD) players, audio players, refrigerators, air conditioners, cleaners, ovens, microwave ovens, washing machines, air cleaners, set-top boxes, home automation control panels, media boxes (e.g., Samsung HomeSync®, Apple TV®, or Google TV™), game consoles (e.g., Xbox® and PlayStation®), electronic dictionaries, electronic keys, camcorders, or electronic picture frames.

According to an embodiment of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), navigation devices, global navigation satellite systems (GNSS), vehicle infotainment devices, electronic equipment for vessels (e.g., navigation systems and gyrocompasses), head units for vehicles, industrial or home robots, drones, or points of sales devices (POSs). The devices may include at least one of furniture, buildings/structures or a part of a car, electronic boards, electronic signature receiving devices, or various measuring instruments (e.g., water meters, electricity meters, gas meters, or wave meters, and the like). The electronic devices may be flexible or a combination of two or more of the above-mentioned devices. Electronic devices are not intended to be limited to the above-mentioned devices.

The term "user" used in various embodiments may refer to a person who uses an electronic device or a device that uses an electronic device (for example, an artificial intelligence electronic device).

At least a portion of an apparatus (for example, modules or functions thereof) or a method (for example, operations) according to an embodiment of the present disclosure may be implemented by instructions stored in a non-transitory computer-readable recording media (for example, a memory) in the form of a programmable module. If an instruction is executed by a processor, the processor may perform a function corresponding to the instruction.

Non-transitory computer-readable recording media may include a hard disk, a floppy disk, a magnetic media (for example, a magnetic tape), an optical recording media (for example, compact disc read only memory (CD-ROM), a digital versatile disc (DVD), a magneto-optical media (for example, a floptical disk)), and an internal memory. In addition, an instruction may include code generated by a compiler or code executable by an interpreter. A module or a programming module according to an embodiment of the present disclosure may include at least one of the above elements, or a portion of the above elements may be omitted, or additional other elements may be further included. Operations performed by a module, a programming module, or other elements may be executed sequentially, in parallel, repeatedly, or in a heuristic method. In addition, a portion of operations may be executed in different sequences, omitted, or other operations may be added.

Hereinafter, an operating method and an apparatus according to various embodiments of the present disclosure are described with reference to the accompanying drawings. However, since various embodiments of the present disclosure are not intended to be restricted or limited by the following description, it should be noted that the present disclosure may be applied to various embodiments based on the following embodiments. In various embodiments described below, a hardware approach method will be described by way of example. However, since various embodiments of the present disclosure include technology which use both hardware and software, various embodiments of the present disclosure do not exclude an approach method based on software.

Figure 2:
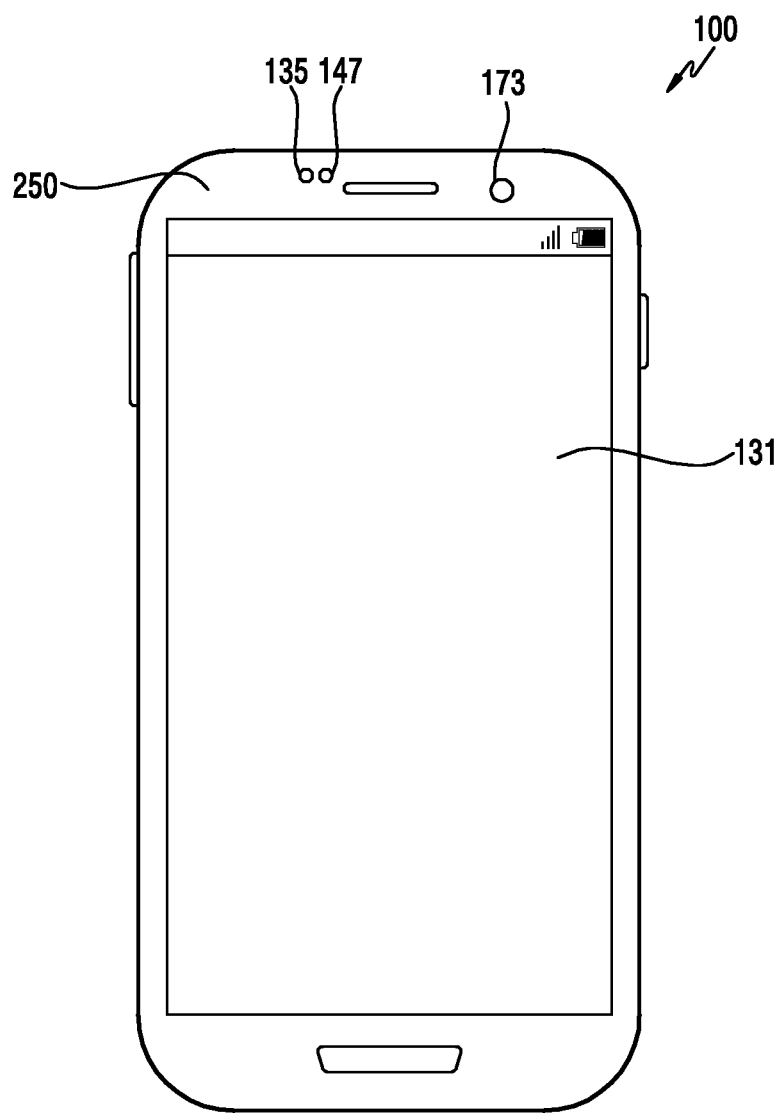
FIG. 2 is an illustration of an electronic device according to an embodiment of the present disclosure.

FIG. 1 is a block diagram of an electronic device according to an embodiment of the present disclosure. FIG. 2 is an illustration of an electronic device according to an embodiment of the present disclosure.

Referring to FIGS. 1 and 2, an electronic device 100 may include, for example, a wireless communication unit 110, a user inputter 120, a touch screen 130, a proximity detector 135, an iris recognition module 145, an audio processor 140, a memory 150, an interface 160, a camera module 170, a controller 180 (for example, a processor including processing circuitry), and a power supply 190. According to an embodiment of the present disclosure of the present disclosure, the elements of the electronic device 100 shown in FIG. 1 are not essential and the electronic device 100 may include more elements than in FIG. 1 (for example, a biometric module (for example, a fingerprint recognition module), an illuminance module, a front camera, or the like), or may include fewer elements than in FIG. 1. The electronic device 100 may exclude some elements, for example, the wireless communication unit 110 or the like, according to the type of the electronic device. The above-described elements of the electronic device 100 may be mounted in a housing (or a main body) 250 of the electronic device 100 or may be mounted outside the housing 250.

The wireless communication unit 110 may include one or more modules for enabling wireless communication to be performed between the electronic device 100 and other external electronic devices. For example, the wireless communication unit 110 may include a mobile communication module 111, a wireless local area network (WLAN) module 113, a short range communication module 115, and a location calculation module 117. According to an embodiment of the present disclosure, the wireless communication unit 110 may include a module (for example, a short range communication module, a long range communication module, or the like) for communicating with a neighboring external electronic device.

The mobile communication module 111 may include, for example, a cellular module. The mobile communication module 111 may transmit and receive radio signals to and from at least one of a base station, an external electronic device, or various servers (for example, an application server, a management server, an integration server, a provider server, a content server, an internet server, a cloud server, or the like) on a mobile communication network. The radio signal may include a voice signal, a data signal, or various types of control signals. The mobile communication module 111 may transmit various data necessary for the operations of the electronic device 100 to an external electronic device in response to a user request.

The wireless LAN module 113 may indicate a module for wirelessly connecting to the Internet and forming a wireless LAN link with other external electronic devices. The wireless LAN module 113 may be embedded inside or provided outside the electronic device 100. Wireless Internet technology may use wireless fidelity (WiFi), light fidelity (LiFi), Wireless Gigabit Alliance (WiGig), wireless broadband (Wibro), world interoperability for microwave access (WiMax), high speed downlink packet access (HSDPA), or millimeter wave (mmWave). The wireless LAN module 113 may transmit or receive various data of the electronic device 100 to or from an external electronic device by operating with the external electronic device which is connected to the electronic device 100 via a network (for example, a wireless Internet network). The wireless LAN module 113 may always maintain an on state or may be turned on/off according to settings of the electronic device 100 or a user input.

The short range communication module 115 may indicate a module for performing short range communication. The short range communication technology may use Bluetooth, Bluetooth low energy (BLE), radio frequency identification (RFID), an Infrared Data Association (IrDA), ultra wideband (UWB), ZigBee, near field communication (NFC), or the like. The short range communication module 115 may transmit or receive various data of the electronic device 100 to or from an external electronic device by operating with the external electronic device connected to the electronic device 100 via a network (for example, a short range communication network). The short range communication module 115 may always maintain an on state or may be turned on/off according to settings of the electronic device 100 or a user input.

The location calculation module 117 is a module for acquiring the location of the electronic device 100, and may include a global positioning system (GPS) module as a representative example. The location calculation module 117 may measure the location of the electronic device 100 by triangulation. The location information of the electronic device 100 may be acquired in various methods.

The user inputter 120 may generate input data for controlling the operations of the electronic device 100 in response to a user input. The user inputter 120 may include at least one input device for detecting a user's various inputs. For example, the user inputter 120 may include a keypad, a dome switch, a physical button, a touch pad (resistive/capacitive), a jog & shuttle, and a sensor. According to an embodiment of the present disclosure, the user inputter 120 may include an electronic pen. The user inputter 120 may be implemented to receive a force touch.

According to an embodiment of the present disclosure, a sensor may measure, for example, a physical quantity or may detect an operational state of the electronic device 100 and may convert the measured or detected information to an electrical signal. The sensor may include, for example, a force sensor, an iris scan sensor, a fingerprint scan sensor, an image sensor, or an illuminance sensor. In addition, the sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (e.g., a red, green, blue (RGB) sensor), a medical sensor, a temperature-humidity sensor, an ultra violet (UV) light sensor, or a heart rate monitor (HRM) sensor. In addition, the sensor may include, for example, an electronic nose (E-nose) sensor, an electromyography (EMG) sensor, an electroencephalogram (EEG) sensor, an electrocardiogram (ECG) sensor, or an infrared (IR) sensor.

The user inputter 120 may have a part thereof implemented on the outside of the electronic device 100 in the form of a button, or a part or entirety of the user inputter 120 may be implemented in the form of a touch panel. The user inputter 120 may receive a user input for initiating operations of the electronic device 100 (for example, a power on/off function, an audio reproduction function, a turn-on/turn-off function of the camera module 170, or the like) according to an embodiment of the present disclosure, and may generate an input signal according to a user input.

The touch screen 130 may indicate an input and output device for performing an input function and a display function, simultaneously, and may include a display 131 and a touch sensor 133. The touch screen 130 may provide an input and output interface between the electronic device 100 and a user, and may include a mediatory role of delivering a user's touch input to the electronic device 100 and displaying an output from the electronic device 100 for the user. The touch screen 130 may display a visual output for a user.

The visual output may be displayed in the form of a text, graphics, a video, and a combination thereof.

The display 131 may display (output) a variety of information processed in the electronic device 100. For example, the display 131 may display various user interfaces (UIs) or graphic user interfaces (GUIs) related to the use of the electronic device 100.

According to an embodiment of the present disclosure, the display 131 may display a UI or a GUI related to an iris recognition operation which is performed by the electronic device 100. The display 131 may use various displays. For example, the display 131 may include a liquid crystal display (LCD), an LED display, an organic LED (OLED) display, a microelectromechanical systems (MEMS) display, or an electronic paper display. Some displays may be implemented by using a transparent display configured in a transparent type or a photo-transparent type.

According to an embodiment of the present disclosure, the display 131 may use a bended display or a flexible display. For example, the display 131 may include a flat display or a bent display which may be bent, crooked, or rolled without damage through a thin and flexible substrate like paper. The bent display may be fastened to the housing 250 and may maintain its bent state. The electronic device 100 may be implemented by using a display device which may be freely bent and unbent like a bent display and a flexible display. The display 131 may be flexible to enable folding and unfolding by substituting a glass substrate enclosing liquid crystals in the above-described various displays with a plastic film.

The touch sensor 133 may be seated in the display 131, and may sense a user input which touches or approaches the surface of the touch screen 130. The user input may include a touch input or an approach input which is inputted based on at least one of a single touch, a multi-touch, hovering, or an air gesture. According to an embodiment of the present disclosure, the touch sensor 133 may receive a user input for initiating an operation related to the use of the electronic device 100, and may generate an input signal according to a user input. The touch sensor 133 may be configured to convert a change in a pressure applied to a certain portion of the display 131 or a change in capacitance generated in a certain portion of the display 131 into an electrical input signal. The touch sensor 133 may detect a location and an area of an input tool (for example, a user's finger, an electronic pen, or the like) on the surface of the display 131 if the input tool touches or approaches the surface of the display 131. In addition, the touch sensor 133 may be implemented to detect pressure (for example, a force touch) if a touch is inputted in an applied touch method.

The proximity detector 135 may detect proximity of a user to the electronic device 100, and provide sensing information corresponding to a result of detecting proximity to the controller 180. According to an embodiment of the present disclosure, the proximity detector 135 may be implemented by using one or more sensors described above. For example, the proximity detector 135 may be implemented by using various sensors for measuring a distance between the electronic device 100 and a user, such as a proximity sensor (or a distance sensor) or an infrared sensor.

According to an embodiment of the present disclosure, the proximity detector 135 may be operated (driven) in sequence or in parallel with an iris recognition operation performed in the electronic device 100. The proximity detector 135 may sense (measure) a distance between the electronic device 100 and the user if the electronic device 100 starts the iris recognition operation or during the iris recognition operation, and may transmit sensing information thereon to the controller 180.

According to an embodiment of the present disclosure, the proximity detector 135 (for example, a proximity sensor) may be disposed on a certain region of an upper side of the display 131 if a user faces the front surface of the electronic device 100 as shown in FIG. 2. The proximity detector 135 may be disposed on a lower end (for example, a lower layer) of an inside of the display 131 of the electronic device 100.

The audio processor 140 may transmit an audio signal inputted from the controller 180 to a speaker (SPK) 141, and may forward an audio signal inputted from a microphone (MIC) 143, such as a voice, to the controller 180. The audio processor 140 may convert voice/sound data into an audible sound via the speaker 141 under the control of the controller 180, and output the audible sound, and may convert an audio signal received from the microphone 143 such as a voice into a digital signal, and forward the digital signal to the controller 180.

The speaker 141 may output audio data which is received from the wireless communication unit 110 or stored in the memory 150. The speaker 141 may output sound signals related to various operations (functions) performed in the electronic device 100.

The microphone 143 may receive an external sound signal and process the sound signal into electrical voice data. In the microphone 143, various noise reduction algorithms for removing noise generated in the process of receiving an external sound signal may be implemented. The microphone 143 may be in charge of inputting audio streaming such as a voice command. For example, the microphone 143 may receive a voice instruction for initiating an iris recognition operation.

The memory 150 may store one or more programs which are executed by the controller 180, and may perform a function of temporarily storing inputted/outputted data. The inputted/outputted data may include, for example, a file such as a video, an image, a photo, an audio, or the like. The memory 150 may be in charge of storing acquired data, and may store data acquired on a real time basis in a temporary storage device and may store data which is determined to be stored in a storage device which can store data for a long time.

According to an embodiment of the present disclosure, the memory 150 may store one or more programs, data or instructions related to the controller 180 (for example, a processor) performing an iris recognition operation based on the iris recognition module 145, determining the proximity of an object based on the proximity detector 135 during the iris recognition operation, and, if the proximity of the object is within a set reference range, stopping the iris recognition operation.

According to an embodiment of the present disclosure, the memory 150 may store one or more programs, data, or instructions related to determining the proximity of an object based on the proximity detector 135 prior to performing an iris recognition operation, determining whether the object satisfies an execution condition for executing the iris recognition operation based on a result of determining, and performing the iris recognition operation if the execution condition is satisfied. The memory 150 may store one or more programs, data, or instructions related to determining whether the object satisfies a stopping condition for stopping the iris recognition operation while performing the iris recognition operation, and stopping the iris recognition operation if the stopping condition is satisfied.

The memory 150 may include one or more application modules (or software modules). The memory 150 may store reference information which is registered in advance by a user in relation to user authentication. For example, the reference information may include a fingerprint image (information) for fingerprint-based user authentication, an iris image for iris-based user authentication, a PIN for PIN-based user authentication, or pattern information for pattern-based user authentication.

The interface 160 may receive data from another electronic device or receive power, and may forward data or power to the elements in the electronic device 100. The interface 160 may control internal data of the electronic device 100 to be transmitted to another electronic device. For example, the interface 160 may include a wire/wireless headphone port, an external charger port, a wire/wireless data port, a memory card port, an audio input/output port, a video input/output port, an earphone port, or the like.

The camera module 170 indicates a configuration for supporting a photography function of the electronic device 100. The camera module 170 may photograph a certain subject under the control of the controller 180 and may forward photographed data (for example, an image) to the display 131 and the controller 180. According to an embodiment of the present disclosure, the camera module 170 may include, for example, a first camera 171 (for example, a color (RGB) camera) for acquiring color information, and a second camera 173 (for example, an infrared camera 173 shown in FIG. 2) for acquiring iris information.

According to an embodiment of the present disclosure, the first camera 171 (for example, a color camera) may photograph a color image of a subject by converting light inputted from the outside into an image signal. The first camera 171 may include an image sensor (for example, a first image sensor) for converting light into an image signal. The image sensor may be implemented by using a charged coupled device (CCD) or a complementary metal-oxide semiconductor (CMOS) device. The first camera 171 may be a front camera which is provided on the front surface of the electronic device 100. The front camera may be substituted with the second camera 173 and may not be provided on the front surface of the electronic device 100. The first camera 171 may be arranged on the front surface of the electronic device 100 with the second camera 173. The first camera 171 may be a rear camera which is provided on the rear surface of the electronic device 100. The first camera 171 may include both the front camera and the rear camera which are provided on the front surface and the rear surface of the electronic device 100, respectively.

According to an embodiment of the present disclosure, the second camera 173 (for example, an infrared camera) may photograph an iris image of a user using light (for example, infrared rays (IR)). The second camera 173 may operate as a part of a device constituting the iris recognition module 145. The second camera 173 may include an IR generator and an image sensor which converts IR entering after being reflected from a subject into an image signal. The image signal acquired through the second camera 173 may include depth information (for example, location information, distance information) regarding the subject. The IR generator may generate a regular IR pattern in a depth camera method using an IR pattern method (a structured light method), and may generate IR light having a profile of a certain normal or special form in a depth camera method using a time of flight (TOF) method.

According to an embodiment of the present disclosure, the IR generator may be divided into a light emitter and a light receiver. The light emitter may serve to generate a pattern necessary for acquiring depth information, for example, IR proximity light information. The light emitter may project a regular pattern onto a subject to be restored three-dimensionally. The light receiver may acquire a color image and depth information (for example, IR information) using a proximity light pattern scattered through the light emitter. The light receiver may be the first camera 171 or the second camera 173 and may acquire the depth information and the color image using one or two cameras. For example, the light receiver may use a photo diode which detects light by detecting incident light, converting an amount of detected light into an electrical signal, and outputting the electrical signal. For example, the light receiver may include a photo diode which extracts color information regarding light corresponding to a certain region of a visible region of a light spectrum, for example, red light, green light, and blue light.

The image sensor may convert IR which enters after being projected onto a subject from the IR generator and then being reflected from the subject into a depth image signal. According to an embodiment of the present disclosure, the depth image signal which is converted from the IR may include distance information from respective IR points to the subject so as to be displayed as points, which have different sizes according to distances from IR points to the subject, for example, pixel values. Each IR point of the IR may be displayed as a relatively smaller pixel value if the distance to the subject is longer according to the distance information to the subject, and may be displayed as a relatively larger pixel value if the distance is shorter. The image sensor may be implemented by using a CCD or a CMOS device like the image sensor (for example, the first image sensor) of the first camera 171.

According to an embodiment of the present disclosure, the second camera 173 may be referred to as the infrared camera 173 for easy explanation and understanding in the drawings.

The iris recognition module 145 may analyze and informationize a user's iris characteristic (for example, the shape or color of the iris, or a morphic unit of retina capillaries), and may provide corresponding sensing information to the controller 180. For example, the iris recognition module 145 may encode the pattern of the iris, convert the pattern into an image signal, and transmit the image signal to the controller 180, and the controller 180 may compare and determine the pattern of the iris based on the transmitted image signal.

According to an embodiment of the present disclosure, the iris recognition module 145 may include a light source module 147 and the infrared camera 173 to enhance a recognition rate of a fine distinguishing point of an iris as shown in FIG. 2. The light source module 147 may be implemented by using an infrared LED or an LED. The light source module 147 may output light to enhance a recognition rate of the iris. For example, a user's pupils may dilate according to light outputted from the light source module 147. The infrared camera 173 may adjust a focus based on the dilated pupils using infrared rays, and may image the iris as a photo and transmit the iris image to the controller 180.

According to an embodiment of the present disclosure, the proximity detector 135, and the light source module 147 and the infrared camera 173 constituting the iris recognition module 145 shown in FIG. 2 are not limited to the structure of FIG. 2, and may be arranged or designed variously according to the design of the electronic device 100. A color camera (or a front camera, an RGB camera) may be provided adjacent to the infrared camera 173.

The controller 180 (for example, a processor including processing circuitry) may control an overall operation of the electronic device 100. According to an embodiment of the present disclosure, the controller 180 may include one or more processors or the controller 180 may be referred to as a processor. For example, the controller 180 may include, as separate elements, a CP, an AP, an interface (for example, a general purpose input/output (GPIO)), or an internal memory, or may integrate these elements into one or more integrated circuits. The AP may perform various functions for the electronic device 100 by executing various software programs, and the CP may process and control voice communication and data communication. The controller 180 may execute a certain software module (for example, an instruction set) stored in the memory 150, and may perform various certain functions corresponding to the module.

According to an embodiment of the present disclosure, the controller 180 may control the operations of the hardware modules such as the audio processor 140, the interface 160, the display 131, the camera module 170, the proximity detector 135, the iris recognition module 145, or the like. The controller 180 may be electrically connected to the display 131, the camera module 170, the iris recognition module 145, and the memory 150 of the electronic device 100.

According to an embodiment of the present disclosure, the controller 180 may process an iris recognition operation. The controller 180 may analyze a dark and light pattern of an iris on a region basis using an iris recognition algorithm based on an image transmitted by the iris recognition module 145, and may generate a user's unique iris code. The controller 180 may compare the generated iris code and an image already registered at the memory 150 (for example, a database), and determine whether they match each other.

According to an embodiment of the present disclosure, the controller 180 may determine the proximity of a user based on the proximity detector 135 during the iris recognition operation. The controller 180 may continue to perform the iris recognition operation or may automatically stop the iris recognition operation and output a relevant guide according to the proximity of the user. If it is determined that the user exists within a reference range (or distance) based on the proximity detector 135, the controller 180 may stop the iris recognition operation. For example, the controller 180 may stop the iris recognition module 145 from outputting light (for example, stop the light source module 147 from outputting light). For example, the controller 180 may turn off the light source module 147. The controller 180 may process to display a relevant guide through the display 131 if stopping the iris recognition operation.

According to an embodiment of the present disclosure, the controller 180 may execute an iris recognition operation based on the iris recognition module 145, determine the proximity of an object based on the proximity detector 135 during the iris recognition operation, and, if the proximity of the object is within a set reference range, may control an operation related to stopping the iris recognition operation.

According to an embodiment of the present disclosure, prior to determining an iris recognition operation, the controller 180 may determine the proximity of an object based on the proximity detector 135, may determine whether the object satisfies an execution condition for executing the iris recognition operation based on a result of determining, and, if the object satisfies the execution condition, may process an operation related to executing the iris recognition operation. The controller 180 may determine whether the object satisfies a stopping condition for stopping the iris recognition operation during the iris recognition operation, and, if the object satisfies the stopping condition, may process an operation related to stopping the iris recognition operation.

The control operations of the controller 180 according to an embodiment of the present disclosure is described below in greater detail with reference to the accompanying drawings.

The power supply 190 may receive external power or internal power under the control of the controller 180, and may supply power necessary for the operation of each element. According to an embodiment of the present disclosure, the power supply 190 may supply power to or cut off the power supply to the wireless communication unit 110, the display 131, the camera module 170, the proximity detector 135, the iris recognition module 145 or the like under the control of the controller 180.

According to an embodiment of the present disclosure, the power supply 190 may include, for example, a battery control circuit. The power supply 190 may include a battery (for example, a rechargeable battery and/or a solar battery), a battery remaining capacity measurement circuit or gauge, a power management integrated circuit (PMIC), a charging circuit, a booster circuit, or the like.

According to an embodiment of the present disclosure, the electronic device 100 may include the proximity detector 135; the iris recognition module 145; the memory 150; and a processor or controller 180 electrically connected to the proximity detector 135, the iris recognition module 145, and the memory 150, and the processor may be configured to execute an iris recognition operation based on the iris recognition module 145; determine proximity of an object based on the proximity detector 135 during the iris recognition operation is performed; and, if the proximity of the object includes within a set reference range, stop the iris recognition operation.

According to an embodiment of the present disclosure, the iris recognition module may include a light source module configured to output light during an iris recognition operation; and an infrared camera configured to acquire an iris image using infrared rays.

According to an embodiment of the present disclosure, if the proximity detector determines that an object approaches within a reference range during an iris recognition operation, a processor may be configured to deactivate an iris recognition module and stop a light source module from emitting light.

According to an embodiment of the present disclosure, a processor may be configured to output a guide corresponding to stopping an iris recognition operation based on at least a part of a visual, auditory, or tactile method.

According to an embodiment of the present disclosure, a processor may be configured to drive a proximity detector and a iris recognition module in response to an iris recognition-related event being detected.

According to an embodiment of the present disclosure, if user authentication succeeds based on an acquired iris image and a pre-set reference iris image during the iris recognition operation, a processor may be configured to process a relevant operation corresponding to a situation in which the iris recognition operation is executed.

According to an embodiment of the present disclosure, a processor may be configured to determine a trigger to execute an iris recognition operation based on unlocking an electronic device, selecting a message on a lock screen, or inputting authentication information for user authentication using the electronic device.

According to an embodiment of the present disclosure, a processor may be configured to determine proximity of an object based on a proximity detector prior to executing an iris recognition operation; and determine whether the object satisfies an execution condition for executing the iris recognition operation based on a result of determining that the object satisfies the execution condition.

According to an embodiment of the present disclosure, a processor may be configured to, if an execution condition is not satisfied, output a first guide; if the execution condition is satisfied, execute an iris recognition operation; and, while performing the iris recognition operation, determine whether an object satisfies a stopping condition for stopping the iris recognition operation.

According to an embodiment of the present disclosure, a processor may be configured to determine whether to re-execute an iris recognition operation in response to the iris recognition operation being stopped; and determine whether to re-execute the iris recognition operation based on at least a part of a user input, proximity of an object, or a set time.

Figure 3A:
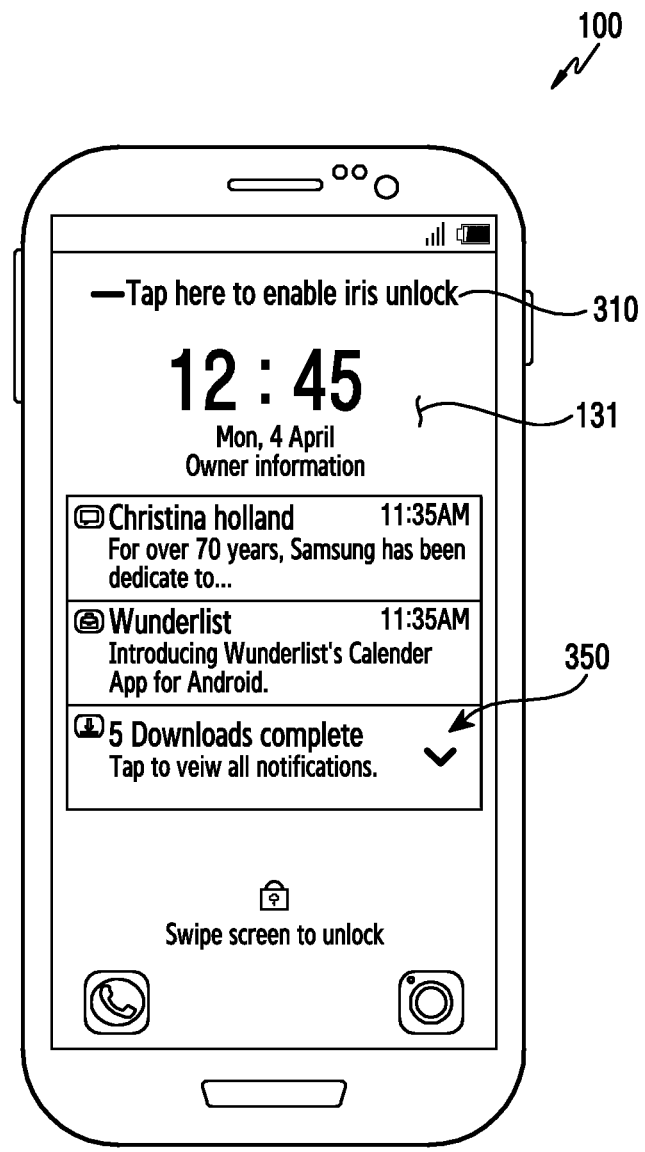
FIGS. 3A, 3B, and 3C are illustrations of an interface provided in an electronic device according to an embodiment of the present disclosure.
Figure 3B:
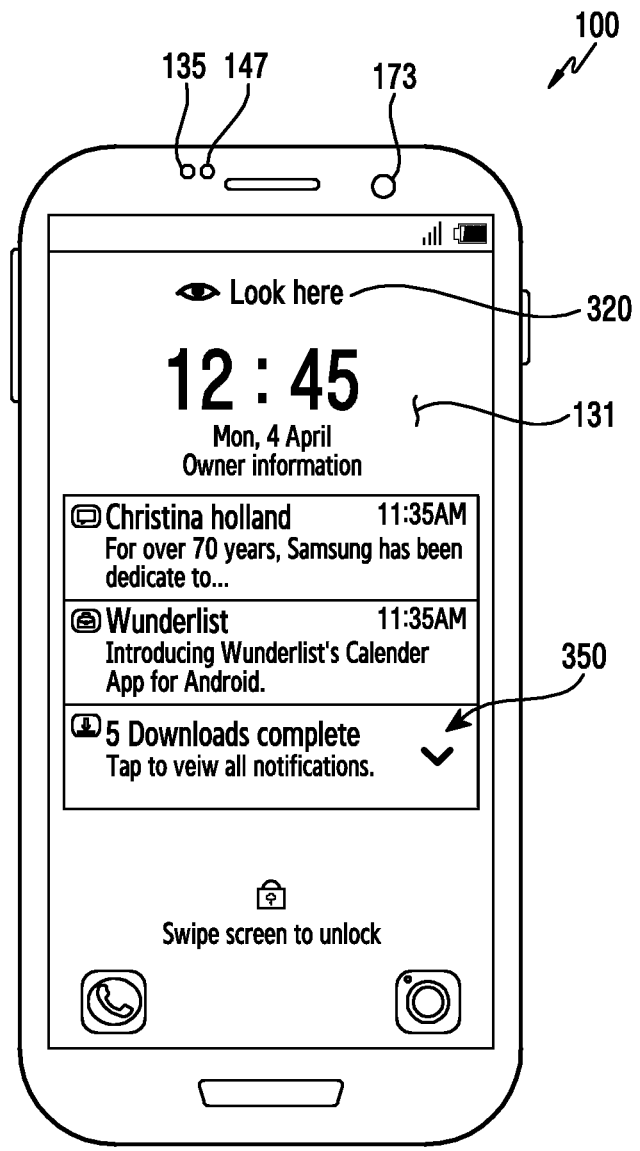
Figure 3C:
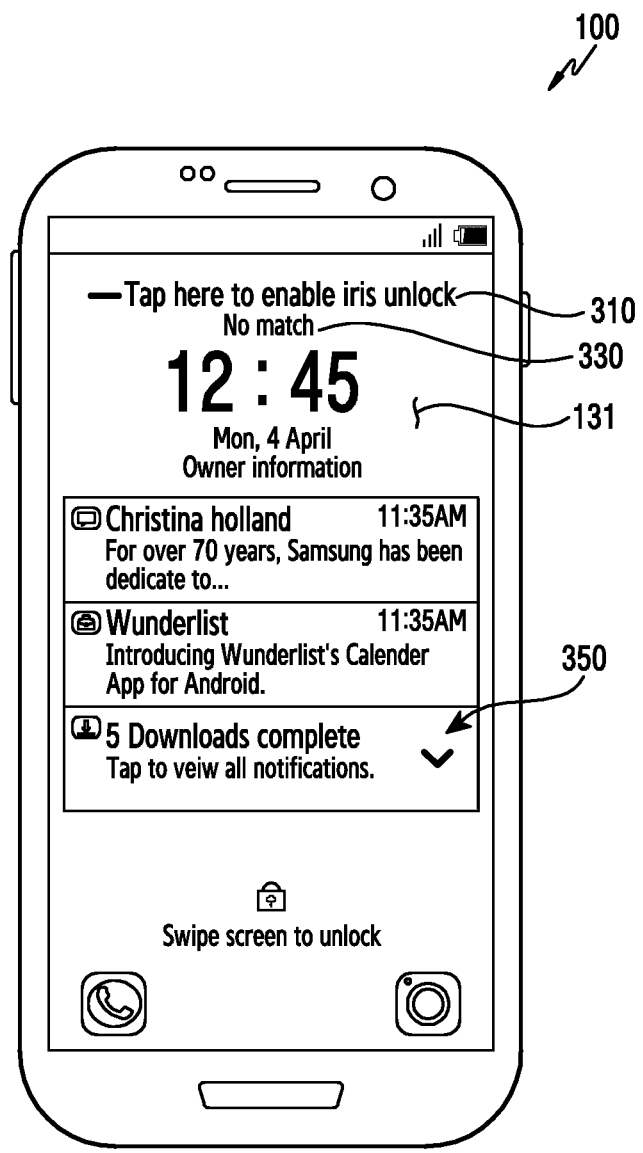

FIGS. 3A, 3B, and 3C are illustrations of an interface which is provided in an electronic device according to an embodiment of the present disclosure.

Referring to FIGS. 3A, 3B, and 3C, FIGS. 3A, 3B, and 3C illustrate an example of a lock screen which is displayed through the display 131 in the electronic device 100 according to an embodiment of the present disclosure.

An object 310, 320 for executing or guiding iris-based user authentication (for example, for executing an iris recognition operation) may be provided on a certain region (for example, an upper side of a screen) of the display 131. According to an embodiment of the present disclosure, the electronic device 100 may provide various notification messages which are received from external electronic devices or servers and are not checked by a user on a lock screen based on a pop-up message 350. If a notification message is not received, the pop-up message 350 may not be displayed on the lock screen. The lock screen as shown in FIGS. 3A, 3B, and 3C may be provided if a lock function by the lock screen is set in the electronic device 100.

FIG. 3A illustrates an example of an initial state in which a lock screen is displayed through the display 131. For example, an interface which is initially displayed if the electronic device 100 is woken up in a standby state (for example, an off state of the display 131) according to a user request (for example, a display 131 turn-on input) and the display 131 is turned on is illustrated.

In the state as shown in FIG. 3A, a user may execute a user authentication method which is set to unlock the lock screen. For example, a user may perform a user input (for example, a tap) based on the first object 310 for executing an iris recognition operation according to an iris-based user authentication method. According to an embodiment of the present disclosure, the first object 310 may indicate an object for guiding and executing unlocking by iris-based user authentication. For example, the first object 310 may be provided in the form of a text (for example, "Tap here to enable iris unlock"), graphics (for example, an icon indicating a user's closed eyes or a corresponding icon), a video (for example, a moving dynamic icon or the like), or a combination thereof. If a user's selection of the first object 310 is detected in a state in which the lock screen is displayed, the electronic device 100 may determine to execute an iris recognition operation and may perform a relevant operation for iris-based user authentication. A user may selectively perform an authentication operation by a fingerprint-based user authentication method, a pattern-based user authentication method, or a PIN-based user authentication method, in addition to the iris-based user authentication.

According to an embodiment of the present disclosure, an iris recognition operation may be executed by selecting a message in the pop-up message 350, in addition to the first object 310. For example, in a state in which the electronic device 100 is locked, a user may select, by a tap, a certain message to check a message of a pop-up message 350 displayed through the lock screen. A selection of a message displayed on a lock screen state may be a user's input which is intended to check the corresponding message. If selection of a message is detected in a lock screen state, the electronic device 100 may determine to execute a message or an application related to the message. In this case, as the electronic device 100 is locked, unlocking by user authentication should precede executing the message or the related application. Accordingly, in response to a message being selected in a lock screen state, the electronic device 100 may determine to execute an iris recognition operation and may perform a relevant operation for iris-based user authentication.

FIG. 3B illustrates an example of a state in which an iris authentication operation is executed according to the example of FIG. 3A. For example, FIG. 3B illustrates a state in which, in response to a user input on the first object 310 or a message of the pop-up message 350 in FIG. 3A, the iris recognition operation is executed.

According to an embodiment of the present disclosure, the electronic device 100 may output light through the light source module 147 constituting the iris recognition module 145, and may photograph and recognize an iris through the infrared camera 173 constituting the iris recognition module 145. The electronic device 100 may automatically track proximity of a user based on the proximity detector 135 if executing an iris recognition operation.

According to an embodiment of the present disclosure, the electronic device 100 may provide relevant information if performing an iris recognition operation. For example, as shown in FIG. 3B, the electronic device 100 may convert the first object 310 into a second object 320 and provide the second object 320. The second object 320 may be an object indicating that an iris recognition operation for iris authentication is being performed and guiding the direction of a user's line of vision. For example, the second object 320 may be provided in the form of a text (for example, "Look here"), graphics (for example, an icon indicating a user's eyes or a corresponding icon), a video (for example, a moving dynamic icon or the like), or a combination thereof.

According to an embodiment of the present disclosure, an iris recognition operation may be performed during a set time (for example, 10 seconds, 15 seconds, or the like). If an iris authentication is typically or normally performed within a set time during an iris recognition operation, the electronic device 100 may stop the iris recognition operation and perform a relevant operation (for example, an unlocking operation). If an iris authentication is not normally performed within a set time during an iris recognition operation, the electronic device 100 may stop the iris recognition operation and may output a relevant guide through the display 131. If proximity of a user is detected by the proximity detector 135 during an iris recognition operation, the electronic device 100 may stop the iris recognition operation and output a relevant guide through the display 131.

According to an embodiment of the present disclosure, stopping an iris recognition operation may include finishing an iris authentication process performed based on an iris recognition algorithm. Stopping an iris recognition operation may include turning off the iris recognition module 145 as described above. For example, the electronic device 100 may stop the light source module 147 of the iris recognition module 145 from outputting light, and may stop the infrared camera 147 from outputting infrared rays. Stopping the light source module 147 or the infrared camera 147 from outputting light may include shutting off power supplied to the corresponding element or stopping the outputting operation in a software level.

FIG. 3C illustrates an example of an interface which is provided if iris authentication is not normally performed according to the example of FIG. 3B. For example, if an iris image acquired by performing an iris recognition operation does not match an already registered iris image, or if a user's iris is not recognized, relevant information may be provided.

For example, as shown in FIG. 3C, the electronic device 100 may convert the second object 320 into the first object 310 and provide the first object 310, and may provide a third object 330 through a region adjacent to the first object 310. According to an embodiment of the present disclosure, the third object 330 may be an object for informing that an iris authentication is not normally performed. The third object 330 may be provided in the form of a text (for example, "No match"), graphics, a video, or a combination thereof.

According to an embodiment of the present disclosure, the third object 330 may be displayed during a set time (for example, 5 seconds, 7 seconds, or the like) and then its display may be automatically removed. For example, the electronic device 100 may remove the display of the third object 330 if a set time lapses, and may not display the third object 330 on the display 131. The electronic device 100 may automatically repeat an iris recognition operation a set number of times (for example, two times) if an iris authentication fails, and may output the third object 330 if the iris authentication fails more than a set number of times (for example, if the iris authentication fails three times).

According to an embodiment of the present disclosure, the electronic device 100 may provide a relevant interface through the display 131 so as to perform a user authentication operation in other user authentication methods (for example, pattern-based, PIN-based, or fingerprint-based methods) if an iris-based user authentication fails. For example, the electronic device 100 may display an interface related to a pattern for pattern-based user authentication, a key pad and an input file for PIN-based user authentication, or a fingerprint recognition guide for fingerprint-based user authentication.

Figure 4A:
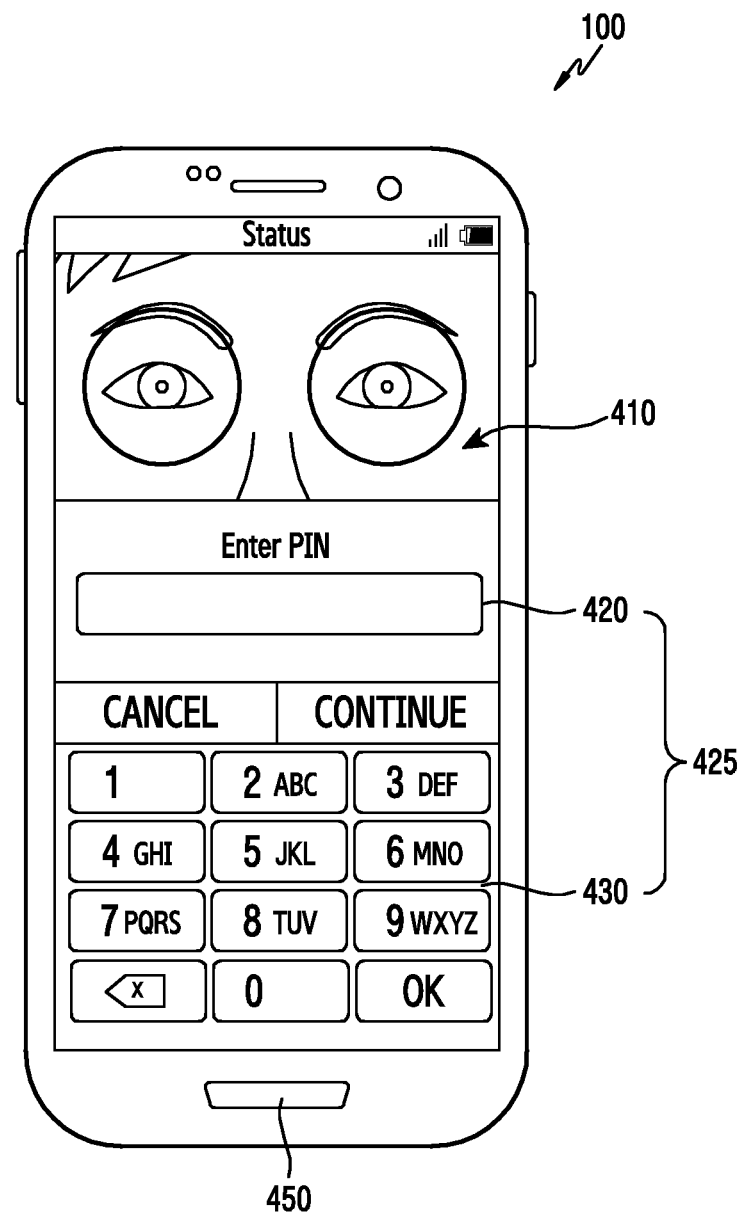
FIGS. 4A and 4B are illustrations of interfaces provided in an electronic device according to an embodiment of the present disclosure.
Figure 4B:
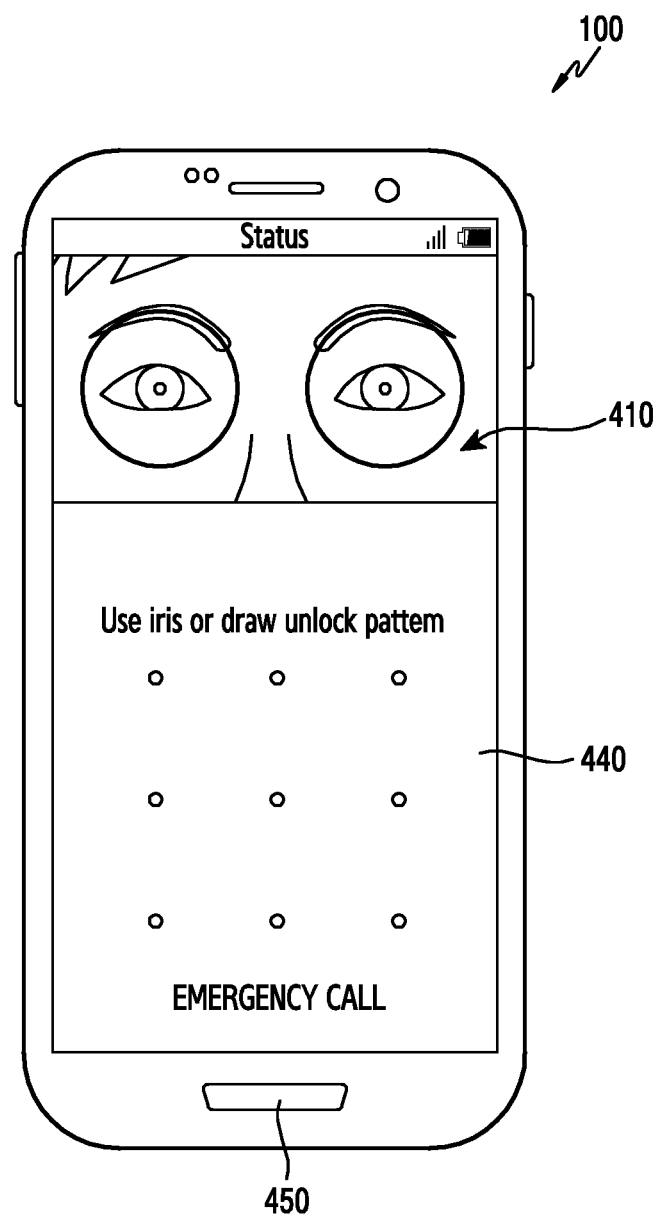

FIGS. 4A and 4B are illustrations of interfaces which are provided in an electronic device according to an embodiment of the present disclosure.

Referring to FIGS. 4A and 4B, FIGS. 4A and 4B illustrate an example of a user authentication-related interface which is displayed through the display 131 in the electronic device 100 according to an embodiment of the present disclosure. FIGS. 4A and 4B illustrate an example of providing a first interface for an iris-based user authentication method in the electronic device 100 and another interface for another user authentication method (for example, a pattern-based user authentication method, a PIN-based user authentication method, a fingerprint-based user authentication method, or the like). The electronic device 100 may provide two or more user authentication methods and may perform an authentication process in any one of the authentication methods or a complex authentication process.

FIG. 4A illustrates an example of providing the first interface 410 related to an iris-based user authentication and the second interface 415 related to a PIN-based user authentication (for example, a PIN input field 420, a keypad 430, or the like). According to an embodiment of the present disclosure, the first interface 410 may be provided in the form of a text, graphics (for example, an image corresponding to an eye of a user or a corresponding icon), or a combination thereof for intuitively guiding the use of the user's iris authentication. Graphics may be provided based on a preview image which is photographed by the front camera or the infrared camera 173 of the electronic device 100. The second interface 425 may include the keypad 430 for inputting a PIN and the input field 420 for displaying PIN information which is inputted by a user through the keypad 430 in a secure format (for example, a display of "*").

FIG. 4B illustrates an example of providing the first interface 410 related to an iris-based user authentication and the third interface 440 related to a pattern-based user authentication. According to an embodiment of the present disclosure, the first interface 410 may be provided in the form of a text (for example, "Use iris or draw unlock pattern"), graphics (for example, an image corresponding to an eye of a user or a corresponding icon) or a combination thereof for intuitively guiding the use of the user's iris authentication (for example, the direction of the line of the eyes). The third interface 420 may be provided in the form of a text (for example, "Use iris or draw unlock pattern) for guiding an input of a pattern for a user's pattern authentication, graphics (for example, a pattern input field in a 3×3 format), or a combination thereof.

According to an embodiment of the present disclosure, if a user authentication operation is performed (for example, if the interface as shown in FIG. 4A or FIG. 4B is displayed), the electronic device 100 may activate the iris recognition module 145 (for example, the light source module 147, the infrared camera 173) to perform an iris recognition operation. The iris recognition operation may be finished according to proximity of a user or may be automatically finished after being performed during a set time.

While an iris-based user authentication is being performed or after an iris recognition operation is finished, a user may perform an operation for a PIN-based user authentication using the second interface 425 or for pattern-based user authentication using the third interface 440. The electronic device 100 may process a relevant authentication operation performed by a user in parallel or in sequence while performing an iris recognition operation. After finishing an iris recognition operation, the electronic device 100 may process a relevant authentication operation performed by a user according to a user manipulation.

According to an embodiment of the present disclosure, the electronic device 100 may process one or more user authentication operations complexly and simultaneously. The electronic device 100 may process a pattern-based authentication process based on a pattern inputted by a user and a reference pattern independently and in parallel, while processing an iris-based authentication process based on an iris image acquired according to an iris recognition operation and a reference iris image. The electronic device 100 may process a PIN-based authentication process based on PIN information inputted by a user and reference PIN information independently and in parallel, while processing an iris-based authentication process based on an iris image acquired according to an iris recognition operation and a reference iris image.

According to an embodiment of the present disclosure, the electronic device 100 may provide fingerprint-based user authentication using a button 450 in a state shown in FIG. 4A or FIG. 4B. For example, the electronic device 100 may be provided with a fingerprint scan sensor formed in the button 450 and a user may perform a fingerprint-based user authentication operation by touching the button 450 with the user's finger or rubbing the button 450.

According to an embodiment of the present disclosure, the electronic device 100 may perform an iris recognition operation for iris-based user authentication during a set time while performing, by a user, a fingerprint-based authentication operation. For example, the electronic device 100 may provide two or more user authentication methods and may process a sequential authentication process based on each authentication method or may process a complex authentication process based on each authentication method.

According to an embodiment of the present disclosure, an interface for user authentication as shown in FIG. 4A or FIG. 4B may be displayed in a screen transition method in which the screen is changed in response to an input (for example, a swipe) set by a user in a lock screen state as shown in FIGS. 3A to 3C. The interface for user authentication as shown in FIG. 4A or FIG. 4B may be provided in response to a user input (for example, selecting an object or a menu for user authentication, an operation requiring user authentication (for example, login, a financial transaction, e-commerce, or the like)) while a certain application is being executed.

Figure 5A:
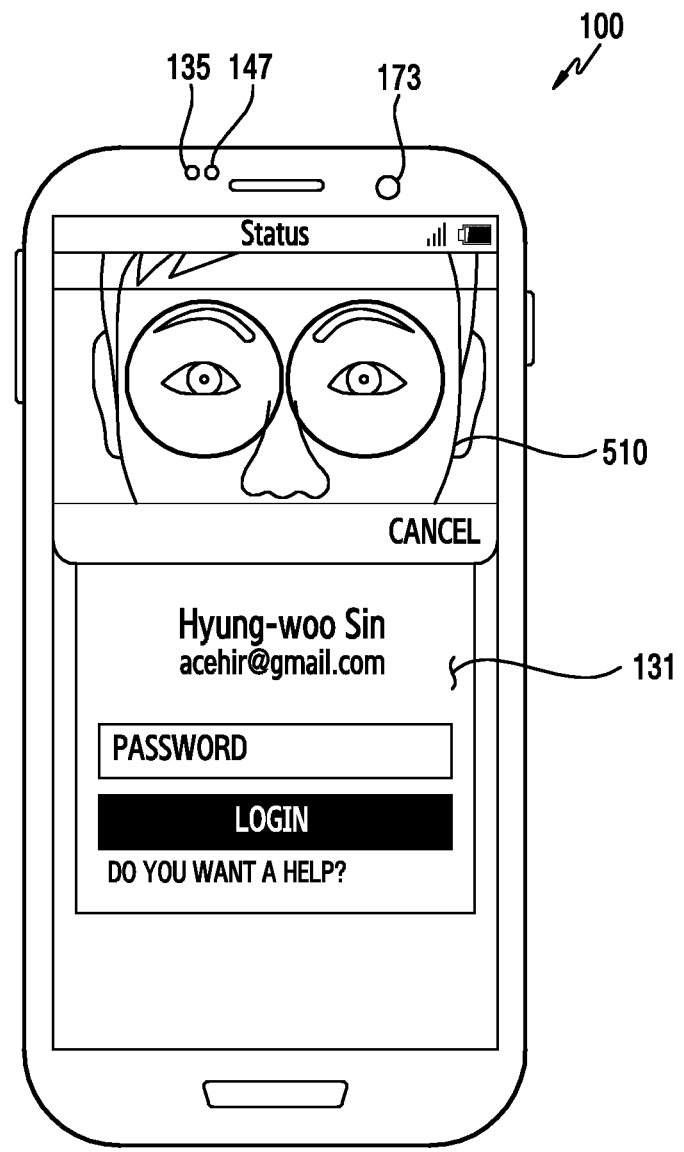
FIGS. 5A and 5B are illustrations of interfaces provided in an electronic device according to an embodiment of the present disclosure.
Figure 5B:
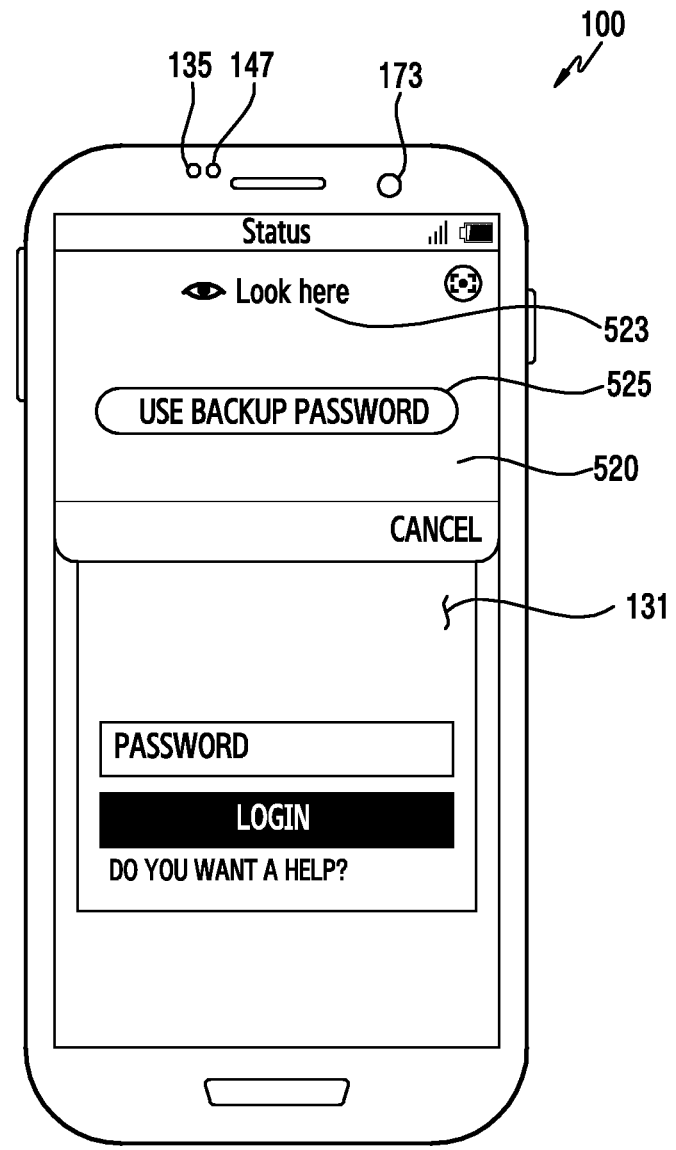

FIGS. 5A and 5B are illustrations of interfaces provided in an electronic device according to an embodiment of the present disclosure.

Referring to FIGS. 5A and 5B, FIGS. 5A and 5B illustrate an example of providing a user authentication-related interface in response to a situation in which user authentication is required (for example, login, a financial transaction, e-commerce, or the like) while performing a function or an application in the electronic device 100. FIGS. 5A and 5B illustrate an example of a case in which user authentication is required if a website is accessed or an application is executed.

According to an embodiment of the present disclosure, if user authentication is required while an operation according to a certain function or application is being performed, the electronic device 100 may identify a set user authentication method. The set user authentication method may be an iris recognition-based user authentication method. For example, if user authentication is required, the electronic device 100 may determine that an iris recognition-related event occurs.

In response to an iris recognition-related event, the electronic device 100 may display an interface 510 or 520 related to iris-based user authentication through a certain region of the display 131. According to an embodiment of the present disclosure, the interface 510 shown in FIG. 5A may be provided based on a preview image, and the interface 520 shown in FIG. 5B may provide a guide to selectively perform iris-based user authentication and user authentication by other methods (for example, a PIN-based). For example, the interface 520 may include information 523 related to iris-based user authentication (for example, an eye icon, a text "Look here"), and information 525 related to PIN-based user authentication (for example, a text "USE BACKUP PASSWORD"). The electronic device 100 may provide a backup password set by a user by substituting a password with an application's own PIN or password.

According to an embodiment of the present disclosure, the interface 520 is not limited to the example of FIG. 5B, and the interface 520 may be implemented to further include relevant information for supporting other user authentication methods such as a fingerprint-based authentication method (for example, a text "Use fingerprint").

According to an embodiment of the present disclosure, the electronic device 100 may provide the interface 510 or 520 by overlaying the interface 510 or 520 on a screen related to a function or application which is being executed. The electronic device 100 may execute an iris recognition operation in sequence or in parallel with providing the interface 510 or 520. For example, the electronic device 100 may process a relevant operation for iris recognition by driving the iris recognition module 145 (for example, the light source module 147, the infrared camera 173).

According to an embodiment of the present disclosure, the electronic device 100 may execute a tracking operation for determining proximity of a user in sequence or in parallel with performing a relevant operation for iris recognition. For example, the electronic device 100 may process a relevant operation for sensing proximity by driving the proximity detector 135.

Figure 6:
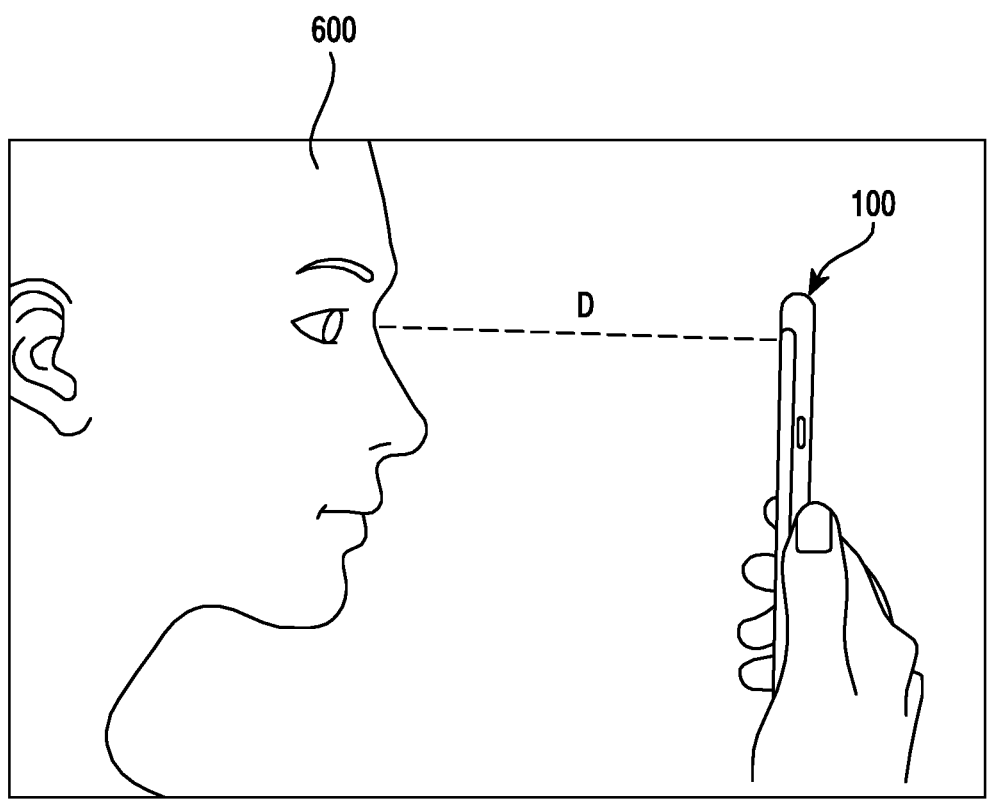
FIG. 6 is an illustration of an iris recognition operation according to an embodiment of the present disclosure.

FIG. 6 is an illustration of an iris recognition operation according to an embodiment of the present disclosure.

Referring to FIG. 6, the electronic device 100 may determine proximity of a user based on the proximity detector 135 during an iris recognition operation as described above. If the proximity of a user is within a set reference range, the electronic device 100 may stop the iris recognition operation.

According to an embodiment of the present disclosure, proximity of a user may be determined based on a distance (D) between the electronic device 100 and a certain object 600 (for example, the user's face) as shown in FIG. 6. The electronic device 100 may have information on a reference range (for example, a reference distance) pre-set therein, for triggering stoppage of an iris recognition operation. The electronic device 100 may measure the distance (D) between the electronic device 100 and the user 600 based on the proximity detector 135 prior to executing an iris recognition operation. The electronic device 100 may continuously measure the distance (D) between the electronic device 100 and the user 600 based on the proximity detector 135 during an iris recognition operation.

According to an embodiment of the present disclosure, the distance between the electronic device 100 and the user 600 may indicate a distance (D) in a straight line between the electronic device 100 and the user 600 (for example, a user's face or eye) in a state in which the user is looking at the electronic device 100 (for example, the user is located in front of the electronic device 100 with the user's face facing the electronic device 100).

According to an embodiment of the present disclosure, the electronic device 100 may determine the distance to the user 600 prior to performing an iris recognition operation, and, if the distance (D) to the user 600 is shorter than a pre-set reference distance, may not perform an iris recognition operation. The electronic device 100 may determine the distance (D) to the user 600 while performing an iris recognition operation, and, if the distance (D) to the user 600 is less than a pre-set reference distance, may stop an iris recognition operation.

Figure 7:
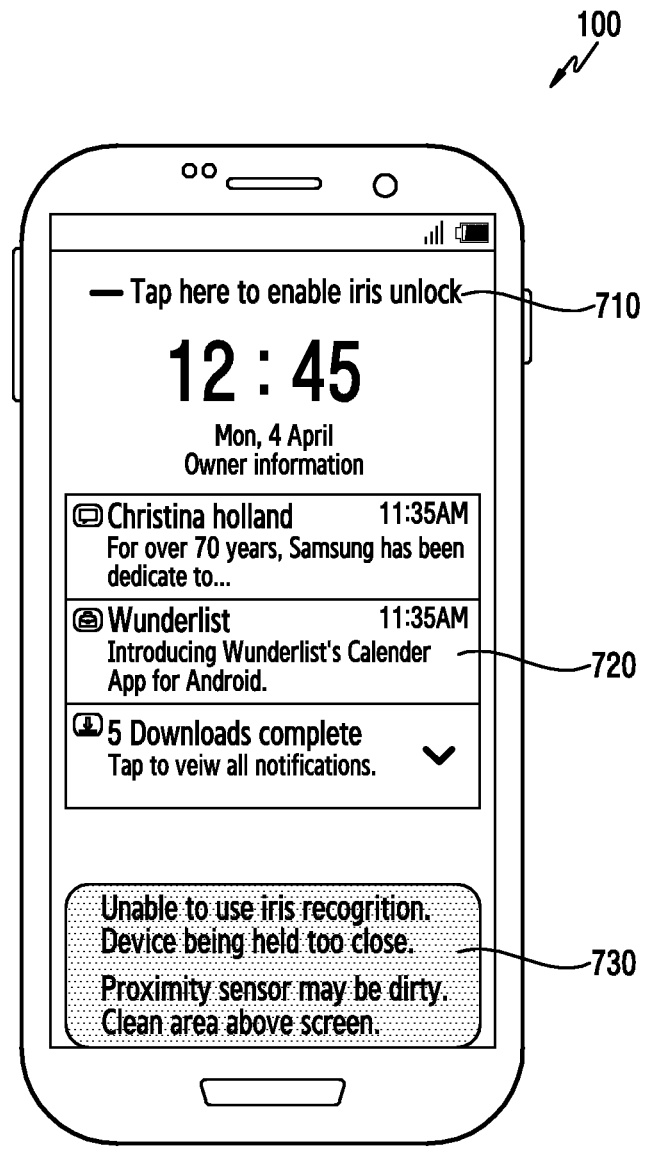
FIG. 7 is an illustration of guiding user authentication in an electronic device according to an embodiment of the present disclosure.

FIG. 7 is an illustration of guiding user authentication in an electronic device according to an embodiment of the present disclosure.

Referring to FIG. 7, FIG. 7 illustrates an example of providing a relevant guide in response to an iris recognition operation being stopped if a user enters within a set distance while an iris recognition operation is being performed in the electronic device 100 according to an embodiment of the present disclosure. In FIG. 7, the electronic device 100 displays a lock screen in a lock state as described in FIG. 3A, FIG. 3B or FIG. 3C.

The electronic device 100 may provide an object 710 (for example, the first object 310 of FIG. 3A) for executing or guiding iris-based user authentication (for example, an iris recognition operation (function)) through a certain region of the lock screen (for example, an upper side of a screen). For example, the electronic device 100 may convert the second object 320 of FIG. 3B which is being displayed according to an iris recognition operation into the object 710 (for example, the first object 310 of FIG. 3A) in response to an iris recognition operation being stopped.

According to an embodiment of the present disclosure, the electronic device 100 may provide a pop-up message 350 for providing various notification messages through a certain region (for example, a middle region of a screen) of the lock screen.

According to an embodiment of the present disclosure, the electronic device 100 may provide a guide 730 related to stopping an iris recognition operation according to proximity of a user through a certain region (for example, a lower region of the screen) of the lock screen. The guide 730 may be provided in the form of a text (for example, "Unable to use iris recognition. Device being held too close."), graphics (for example, an image indicating a reference distance between the electronic device 100 and a user), a video (for example, a video or a dynamic image for adjusting the distance between the electronic device 100 and a user), or a combination thereof. For example, the guide 730 may be provided in various forms to inform a user of stoppage of an iris recognition operation since the user and the electronic device 100 are close to each other.

According to an embodiment of the present disclosure, the electronic device 100 may further include information indicating that an iris recognition operation is not be performed according to a state of the proximity detector 135 if providing the guide 730. If a user performs an iris-based authentication operation using the electronic device 100, there may be another object between the user and the electronic device 100 or the proximity sensor of the electronic device 100 may be covered with a foreign substance (for example, dust, rain drops, cosmetics). Therefore, the guide 730 may further include relevant information indicating that the proximity sensor may not operate normally due to another object or foreign substance, and accordingly, an iris recognition operation is stopped (for example, "Proximity sensor may be dirty. Clean area above screen.").

According to an embodiment of the present disclosure, the guide 730 may be displayed during a set time, and may not be automatically displayed if a predetermined time lapses. For example, the display of the guide 730 may be removed from the lock screen if the set time lapses. The guide 730 may not be displayed according to a trigger for re-executing an iris recognition operation. For example, the electronic device 100 may determine, as a trigger to re-execute an iris recognition operation, a user input by the above-described object 710 (for example, selecting the object 710), a user input by selecting a message of the pop-up message 720 (for example, selecting a message), or a user input (for example, a swipe) for calling a user authentication-related interface as shown in FIG. 4A or FIG. 4B described above. The electronic device 100 may remove the display of the guide 730 in response to a trigger, and may perform the above-described corresponding iris recognition operation.

Figure 8:
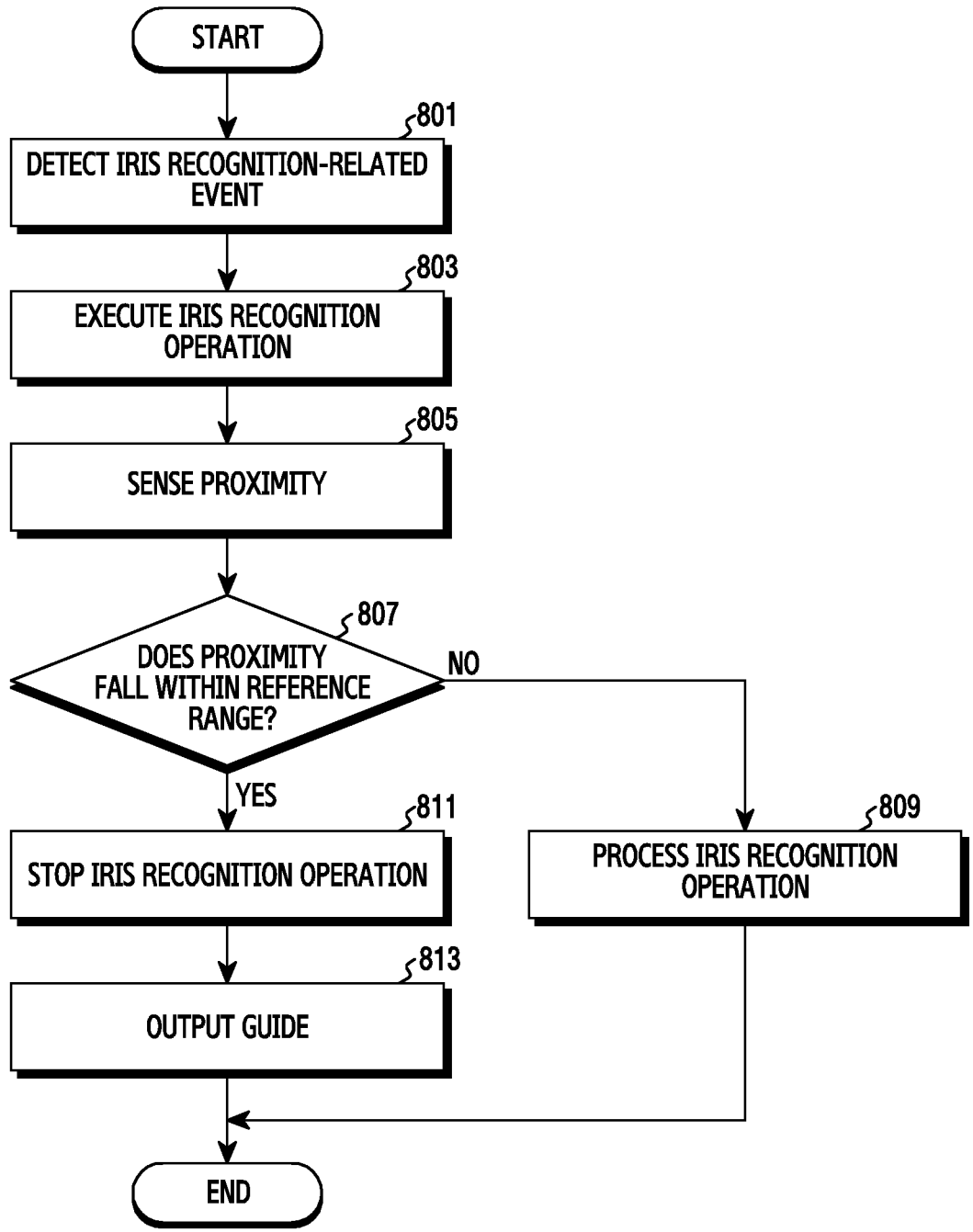
FIG. 8 is a flowchart of a method of performing an iris authentication operation in an electronic device according to an embodiment of the present disclosure.

FIG. 8 is a flowchart of a method of performing an iris recognition operation in an electronic device according to an embodiment of the present disclosure.

Referring to FIG. 8, in step 801, the controller 180 (for example, a processor including processing circuitry) of the electronic device 100 may detect an iris recognition-related event. For example, a user may set an iris authentication method as a lock function and may perform a certain input to unlock (for example, an input of turning on the display 131, an unlock input in a lock screen display state, an input of selecting a message in the lock screen display state, or the like). Alternatively, a user may set an iris authentication method as a user authentication method while using the electronic device 100, and may use an application requiring user authentication (for example, a financial transaction, e-commerce, login, or the like). If execution of a function related to user authentication is detected during an operation of an electronic device in a state in which a security function by iris authentication is set, the controller 180 may determine that an iris recognition-related event occurs.

In step 803, the controller 180 may execute an iris recognition operation in response to an event being detected. For example, the controller 180 may activate (or turn on or drive) the iris recognition module 145. According to an embodiment of the present disclosure, if executing an iris recognition operation, the controller 180 may activate (or turn on) the proximity detector 135 to determine proximity of a user in sequence or in parallel with activating the iris recognition module 145.

In step 805, the controller 180 may sense proximity. According to an embodiment of the present disclosure, the controller 180 may determine proximity of a user by means of the proximity detector 135 in sequence or in parallel with recognizing, by an iris recognition module 145, an iris in response to an iris recognition operation being executed.

In step 807, the controller 180 may determine whether proximity of a user to the electronic device 100 (for example, a distance) is within (or is included in) a set reference range. For example, the controller 180 may compare a distance (M) between the electronic device 100 and a user, which is measured through the proximity detector 135, and a reference distance set for iris authentication (for example, N (for example, 20 cm, 25 cm, 30 cm, or the like)), and, if the measured distance is less than a reference distance (for example, M<N) based on a result of a comparison, the controller 180 may determine that a user approaches within a reference range.

If it is determined that a user does not approach within a reference range in step 807, the controller 180 may process an iris recognition operation which is being performed in step 809. For example, the controller 180 may acquire a user's iris image through the iris recognition module 145 and may process an operation related to authenticating the user or disabling security by comparing the acquired iris image and a set iris image. According to an embodiment of the present disclosure, if an iris authentication succeeds, the controller 180 may unlock the electronic device 100. If an iris authentication succeeds, the controller 180 may generate authentication information related to user authentication based on an authenticated iris image, and may input the authentication information to a relevant field or transmit the same to a relevant server.

If it is determined that a user approaches within a reference range in step 807, the controller 180 may stop an iris recognition operation in step 811. According to an embodiment of the present disclosure, the controller 180 may deactivate (or turn off) the iris recognition module 145. For example, the controller 180 may control the light source module 147 of the iris recognition module 145 to not output light and may control the infrared camera 173 to not output infrared rays. The controller 180 may control the power supply 190 to shut off power supplied to the iris recognition module 145.

In step 813, the controller 180 may process a guide output. For example, the controller 180 may control a visual output (for example, a pop-up display) for displaying guide information through the display 131 or may control an auditory output (for example, a voice output) for outputting guide information through the speaker 141 in sequence or in parallel with stopping an iris recognition operation.

Figure 9:
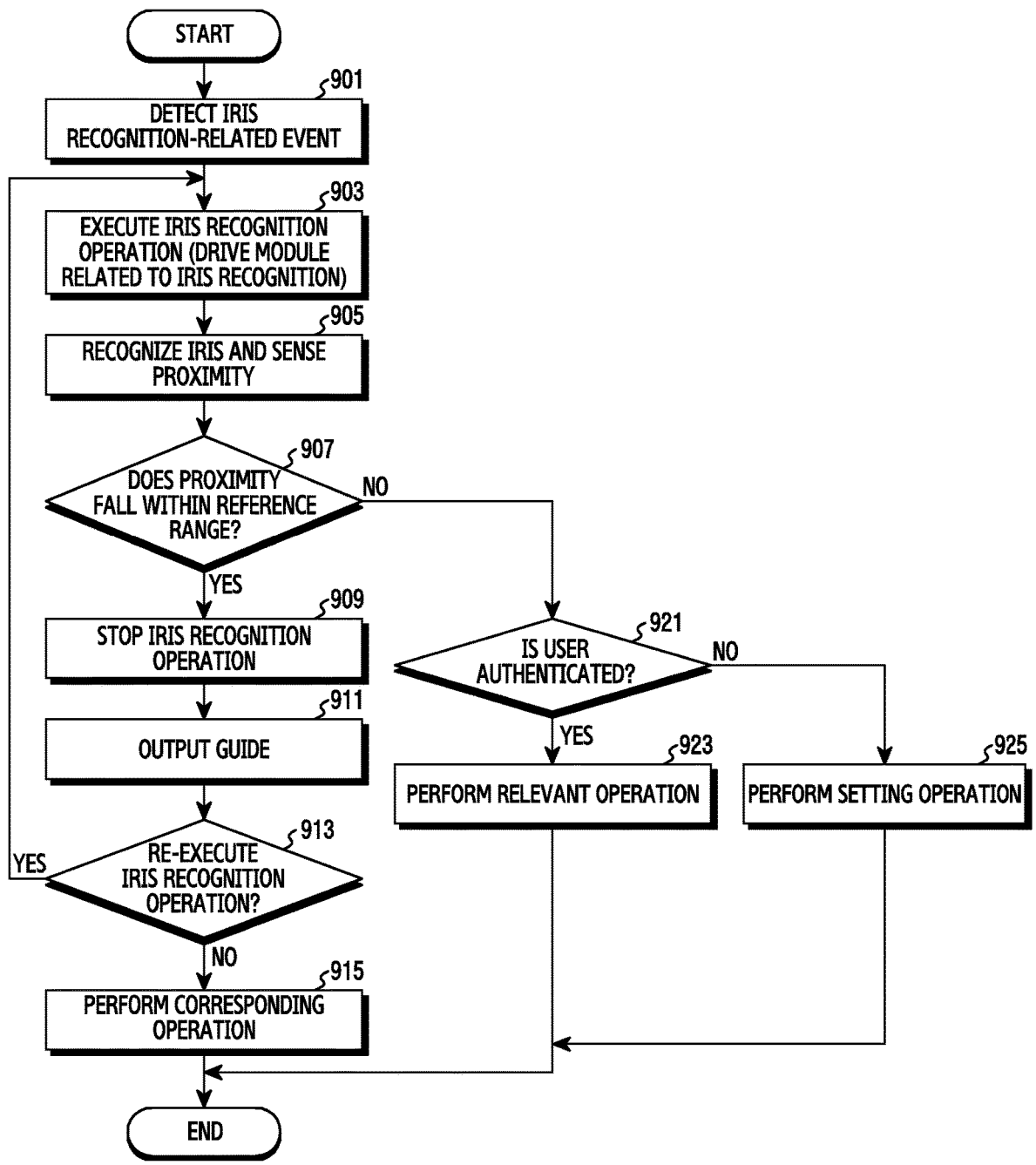
FIG. 9 is a flowchart of a method of performing an iris recognition operation in an electronic device according to an embodiment of the present disclosure.

FIG. 9 is a flowchart of a method of performing an iris recognition operation in an electronic device according to an embodiment of the present disclosure.

Referring to FIG. 9, in step 901, the controller 180 of the electronic device 100 may detect an iris recognition-related event. For example, the controller 180 may determine an iris recognition-related event based on whether the electronic device 100 is unlocked, whether a message is selected on the lock screen, whether authentication information for user authentication is inputted using the electronic device 100, or the like.

In step 903, the controller 180 may execute an iris recognition operation in response to an event being detected. For example, the controller 180 may drive one or more modules related to iris recognition. According to an embodiment of the present disclosure, the controller 180 may drive the proximity detector 135 of the iris recognition module 145. If the proximity detector 135 has already been driven, the controller 180 may not drive the proximity detector 135 in step 903.

In step 905, the controller 180 may recognize an iris and sense proximity. For example, the controller 180 may determine a distance between the electronic device 100 and a user by means of the proximity detector 135 while executing, by the iris recognition module 145, an iris authentication process.

In step 907, the controller 180 may determine whether proximity of a user to the electronic device 100 is within a set reference range. For example, the controller 180 may determine whether a user approaches within a distance less than a reference distance set in the electronic device 100 while performing an iris authentication process according to an iris recognition operation.

If it is determined that a user approaches within a reference range in step 907, the controller 180 may stop an iris recognition operation in step 909. For example, the controller 180 may deactivate the iris recognition module 145 and may stop the light source module 147 from emitting light.

In step 911, the controller 180 may process a set guide output in sequence or in parallel with stoppage of an iris recognition operation. For example, the controller 180 may control to output guide information based on at least one of a visual output or an auditory output.

In step 913, the controller 180 may determine whether to re-execute an iris recognition operation. According to an embodiment of the present disclosure, after stopping an iris recognition operation according to proximity of a user, the controller 180 may determine an event (for example, a set condition or input) related to automatic re-execution of a stopped iris recognition operation. The event related to an automatic re-execution of an iris recognition operation may include at least one event which is generated based on an intended user input for executing an iris recognition operation, based on proximity which is obtained as a result of continuously monitoring proximity between the electronic device 100 and a user, or based on a time which is set to automatically re-execute an iris recognition operation (for example, a time base).

According to an embodiment of the present disclosure, the controller 180 may determine to re-execute an iris recognition operation in response to an input (for example, a touch or a tap) to select an object (for example, the object 710 of FIG. 7, the pop-up message 720 of FIG. 7) related to iris authentication execution from among objects displayed through the display 131 being detected in the state in which an iris recognition operation is stopped. If the proximity of a user is continuously checked and is out of a set reference range in a state in which an iris recognition operation is stopped, the controller 180 may determine to re-execute an iris recognition operation. The controller 180 may count a waiting time (for example, 3 seconds, 5 seconds, or the like) which is set at a time when an iris recognition operation is stopped, and may determine to re-execute the iris recognition operation if the set time lapses.

According to an embodiment of the present disclosure, step 913 of determining whether to re-execute an iris recognition operation may be performed or may not be performed according to a setting of an option (or a menu) related to re-execution of an iris recognition operation in the electronic device 100 (for example, activation/deactivation of a corresponding function). For example, if the related option is set to deactivate a function, the controller 180 may not determine an event related to re-execution of an iris recognition operation, and may directly proceed to step 915. If a related option is set to activate a function, the controller 180 may perform step 913 of determining an event related to re-execution of an iris recognition operation.

If the controller 180 determines to re-execute an iris recognition operation in step 913, the controller 180 proceeds to step 903 to process operations after step 903.

If re-execution of an iris recognition operation is not detected in step 913, the controller 180 may perform a corresponding operation in step 915. According to an embodiment of the present disclosure, if an event related to re-execution of an iris recognition operation is not detected within a set time, a function related to an iris recognition operation (or mode) is finished by a user, or an option related to re-execution of an iris recognition operation is set to deactivate as described above, and the controller 180 may finish an iris recognition operation and provide a previous execution state. The controller 180 may control to return to a previous step such as displaying a lock screen or displaying an execution screen of a previously executed application.

In step 907, if it is determined that a user does not approach within a reference range, the controller 180 may determine whether user authentication succeeds according to an iris authentication process in step 921. For example, the controller 180 may determine whether an iris image acquired through iris recognition matches a pre-set reference iris image by comparing the acquired iris image and the reference iris image. According to an embodiment of the present disclosure, if an acquired iris image matches a reference iris image, the controller 180 may determine that user authentication succeeds. If an acquired iris image does not match a reference iris image, the controller 180 may determine that user authentication fails.

If it is determined that user authentication succeeds in step 921, the controller 180 may perform a relevant operation in step 923. According to an embodiment of the present disclosure, if an iris recognition-related event is to unlock the electronic device 100, the controller 180 may unlock the electronic device 100 in response to an iris-based user authentication. If the iris recognition-related event is to select a message on a lock screen of the electronic device 100, the controller 180 may unlock the electronic device 100 in response to an iris-based user authentication and then display a selected message or execute an application corresponding to the selected message. If the iris recognition-related event is to input authentication information for user authentication using the electronic device 100, the controller 180 may generate authentication information related to a user authentication based on an authenticated iris image in response to an iris-based user authentication, and may input the authentication information to a relevant field or transmit the same to a relevant server.

If it is determined that user authentication fails in step 921, the controller 180 may perform a setting operation in step 925. According to an embodiment of the present disclosure, the controller 180 may feed a relevant guide accompanied by a failure of an iris authentication back to a user based on a visual, auditory, or tactile output. The controller 180 may finish an iris recognition operation and may output a relevant guide accompanied by a failure of an iris authentication. After outputting a relevant guide accompanied by a failure of iris authentication, the controller 180 may re-execute the above-described corresponding iris recognition operation based on a user input (for example, an input to execute an iris recognition operation). The controller 180 may automatically repeat the above-described corresponding iris recognition operation a set number of times.

Figure 10:
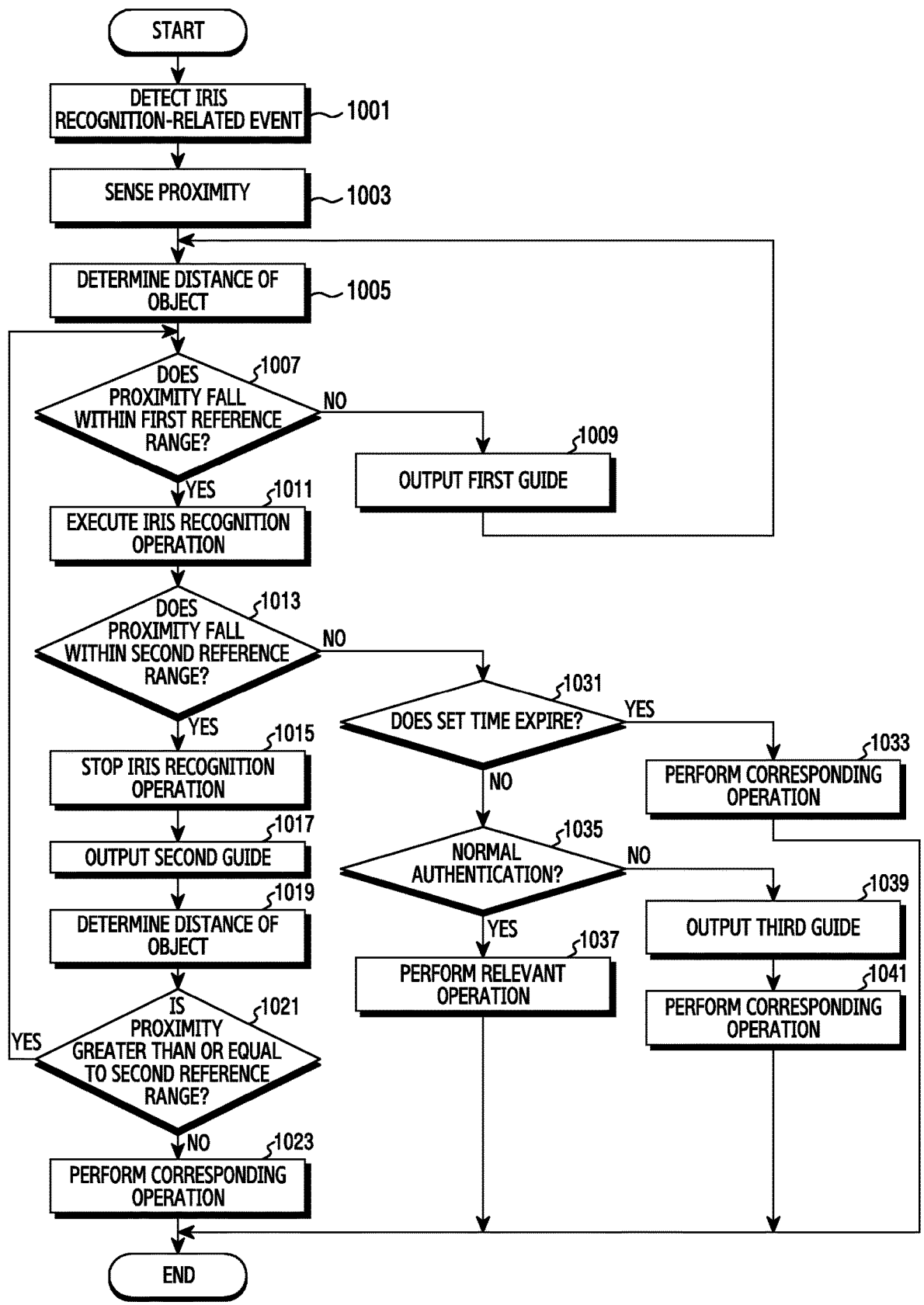
FIG. 10 is a flowchart of a method of performing an iris recognition operation in an electronic device according to an embodiment of the present disclosure.

FIG. 10 is a flowchart of a method of performing an iris recognition operation in an electronic device according to an embodiment of the present disclosure.

Referring to FIG. 10, in step 1001, the controller 180 of the electronic device 100 may detect an iris recognition-related event. For example, the controller 180 may determine a trigger for executing an iris recognition operation based on whether the electronic device 100 is unlocked, whether a message is selected on the lock screen, whether authentication information for user authentication is inputted using the electronic device 100, or the like.

In step 1003, the controller 180 may sense proximity in response to an iris recognition-related event being detected. For example, if the proximity detector 135 is deactivated, the controller 180 may activate the proximity detector 135, and may sense proximity to determine a distance between the electronic device 100 and an object (for example, an object to be sensed by sensing proximity such as a user's face) based on the proximity detector 135.

In step 1005, the controller 180 may determine a distance to an object by sensing proximity.

In step 1007, the controller 180 may determine whether a distance between the electronic device 100 and a user is within a first reference range (for example, a first reference distance) based on a result of determining the distance between the electronic device 100 and the user. According to whether a distance between the electronic device 100 and a user, the first reference range may be indicated by a distance value (for example, 25 cm) set between the electronic device 100 and a user or a distance range (for example, 25 cm~30 cm or the like). The first reference range may be an execution condition for determining whether a user is located within an allowable range (or distance) that may allow a user to perform an iris recognition operation prior to determining an iris recognition operation.

If a distance to an object is not within a first reference range in step 1007, for example, if an object is placed farther than a first reference range or closer than the first reference range, the controller 180 may process an output of a first guide in step 1009. According to an embodiment of the present disclosure, a first guide may include a guide for guiding a distance or a direction so as to induce a user to place the electronic device 100 at an appropriate distance. For example, the controller 180 may output a first guide based on at least one of a visual output or an auditory output. The controller 180 may provide an interface which is set to guide a distance or a direction so as to induce a user to place the electronic device 100 at an appropriate distance.

If the distance to an object is within a first reference range in step 1007, the controller 180 may execute an iris recognition operation in step 1011. For example, the controller 180 may activate the iris recognition module 145 as described above. According to an embodiment of the present disclosure, the controller 180 may control the light source module 147 of the iris recognition module 145 to emit light and control the infrared camera 173 of the iris recognition module 145 to acquire an iris image using infrared rays, and may compare and determine the acquired image based on an iris recognition algorithm. The controller 180 may determine whether user authentication succeeds or fails based on a result of determining an acquired image.

In step 1013, the controller 180 may determine whether a distance to an object is within a second reference range while performing an iris recognition operation. According to an embodiment of the present disclosure, a second reference range may be indicated by a distance value or a distance range which is set between the electronic device 100 and a user. The second reference range may be a stopping condition for determining whether a user is located or enters a reference distance for stopping an iris recognition operation while an iris recognition operation is being performed. The second reference range may be set based on the first reference range. The first reference range may be set as the second reference range. The second reference range may be set to be less than the first reference range (for example, 20 cm).

If it is determined that a distance to an object is within a second reference range in step 1013, the controller 180 may stop an iris recognition operation in step 1015. For example, the controller 180 may deactivate the iris recognition module 145 as described above. According to an embodiment of the present disclosure, the controller 180 may control the light source module 147 of the iris recognition module 145 to stop emitting light. The controller 180 may control both the light source module 147 and the infrared camera 173 to stop emitting light and infrared rays. The controller 180 may stop an authentication operation based on an iris recognition algorithm in response to the iris recognition module 145 being deactivated.

In step 1017, the controller 180 may process an output of a second guide. According to an embodiment of the present disclosure, the second guide may include a guide to stop an iris recognition operation for the purpose of protecting a user's eyes as the electronic device 100 is closer to the user than an appropriate distance during an iris recognition operation, and to induce the user to perform iris authentication based on an appropriate distance. The second guide may include a guide for inducing a user to check the proximity detector 135 for the purpose of preventing malfunction due to foreign substances as described above. For example, the controller 180 may output a second guide based on at least one of a visual output or an auditory output. The controller 180 may provide an interface which is set to induce a user to place the electronic device 100 at an appropriate distance and then perform an iris recognition operation.

In step 1019, the controller 180 may determine a distance to an object by sensing proximity. According to an embodiment of the present disclosure, the controller 180 may sense proximity in sequence or in parallel with outputting a second guide, and may determine a distance to an object by sensing proximity. For example, after stopping an iris recognition operation, the controller 180 may determine whether a user is at an appropriate distance from the electronic device 100 in order to determine whether to automatically re-execute an iris recognition operation.

In step 1021, the controller 180 may determine whether a distance to an object is greater than or equal to a second reference range based on a result of determining a distance to an object. According to an embodiment of the present disclosure, the controller 180 may determine whether a user is far from the electronic device 100 out of a reference distance for stopping an iris recognition operation based on a second reference range.

If it is determined that a distance to an object is greater than or equal to a second reference range in step 1021, the controller 180 may proceed to step 1007 to process operations after step 1007.

If it is determined that a distance to an object is not greater than or equal to a second reference range in step 1021, for example, if it is determined that a distance to an object is within the second reference range, the controller 180 may perform a corresponding operation in step 1023. For example, the controller 180 may track a distance to an object by sensing proximity, and, if it is determined that the distance to the object is greater than or equal to a second reference range, the controller 180 may proceed to step 1007 to process operations after step 1007. For example, the controller 180 may finish both an iris recognition operation based on the iris recognition module 145 and a proximity sensing operation based on the proximity detector 135.

If it is determined that a distance to an object is not within a second reference range in step 1013, the controller 180 may determine whether a set time expires or not in step 1031. According to an embodiment of the present disclosure, an iris recognition operation may be performed during a set time (for example, 10 seconds, 15 seconds, or the like). For example, if an iris authentication is normally performed within a set time during an iris recognition operation, the controller 180 may stop the iris recognition operation and perform a relevant operation (for example, an unlocking operation or the like). For example, if iris authentication is not normally performed within a set time during an iris recognition operation, the controller 180 may stop the iris recognition operation and perform a relevant operation (for example, an operation of maintaining an unlock state or the like). The controller 180 may count a set time if performing an iris recognition operation.

If it is determined that a set time expires in step 1031, the controller 180 may perform a corresponding operation in step 1033. For example, if iris authentication is not normally performed within a set time during an iris recognition operation, the controller 180 may stop the iris recognition operation and output a relevant guide (for example, a guide regarding a failure of the iris authentication) through the display 131. According to an embodiment of the present disclosure, the controller 180 may automatically display an interface for performing user authentication in a different method in parallel with re-executing an iris-based user authentication if the iris-based user authentication fails.

If it is determined that the set time does not expire in step 1031, the controller 180 may determine whether a user authentication succeeds according to an iris authentication process in step 1035. For example, the controller 180 may determine whether an iris image acquired through iris recognition matches a pre-set reference iris image by comparing the acquired iris image and the reference iris image. According to an embodiment of the present disclosure, if an acquired iris image matches a reference iris image, the controller 180 may determine that a user authentication succeeds. If an acquired iris image does not match a reference iris image, the controller 180 may determine that a user authentication fails.

If it is determined that a user authentication succeeds in step 1035, the controller 180 may perform a relevant operation in step 1037. According to an embodiment of the present disclosure, if an iris recognition-related event is to unlock the electronic device 100, the controller 180 may unlock the electronic device 100 in response to an iris-based user authentication. If an iris recognition-related event is to select a message on a lock screen of the electronic device 100, the controller 180 may unlock the electronic device 100 in response to an iris-based user authentication and then display a selected message or execute an application corresponding to the selected message. If an iris recognition-related event is to input authentication information for user authentication using the electronic device 100, the controller 180 may generate authentication information related to a user authentication based on an authenticated iris image in response to an iris-based user authentication, and may input the authentication information to a relevant field or transmit the same to a relevant server.

If it is determined that a user authentication fails in step 1035, the controller 180 may process an output of a third guide in step 1039. According to an embodiment of the present disclosure, a third guide may include at least one of a guide accompanied by a failure of the iris authentication, a guide for inducing a user to re-execute an iris recognition operation, or a guide for inducing the user to perform an authentication process in a different user authentication method. For example, the controller 180 may feed a third guide, which is accompanied by a failure of iris recognition, back to a user based on a visual, auditory, or tactile output.

In step 1041, the controller 180 may process a corresponding operation. According to an embodiment of the present disclosure, after outputting a third guide accompanied by a failure of iris authentication, the controller 180 may re-execute the above-described corresponding iris recognition operation based on a user input (for example, an input to execute an iris recognition operation). The controller 180 may automatically repeat the above-described corresponding iris recognition operation a set number of times. If an iris-based user authentication fails, the controller 180 may display a relevant interface for allowing a user to perform a user authentication operation in other user authentication methods (for example, a pattern-based method, a PIN-based method, a fingerprint-based method, or the like) through the display 131. For example, the controller 180 may display an interface related to a pattern for pattern-based user authentication, a keypad and an input field for PIN-based user authentication, or a fingerprint recognition guide for fingerprint-based user authentication.

According to various embodiments of the present disclosure, steps 1013, 1031, and 1035 described above are not limited to the illustrated order, and the respective operations may be performed in parallel with one another or at least some of the steps may be executed in a different order.

According to an embodiment of the present disclosure, the electronic device 100 may include executing an iris recognition operation based on an iris recognition module; determining proximity of an object based on a proximity detector during an iris recognition operation being performed; and, if a proximity of the object is within a set reference range, stopping the iris recognition operation.

According to an embodiment of the present disclosure, an iris recognition module may include a light source module configured to output light during an iris recognition operation; and an infrared camera configured to acquire an iris image using infrared rays.

According to an embodiment of the present disclosure, stopping an iris recognition operation may include, if a proximity detector determines that an object approaches within a reference range during the iris recognition operation, deactivating the iris recognition module and stopping a light source module from emitting light.

According to an embodiment of the present disclosure, stopping an iris recognition operation may include outputting a guide corresponding to stopping the iris recognition operation based on at least a part of a visual, auditory, or tactile method.

According to an embodiment of the present disclosure, executing an iris recognition operation may include driving a proximity detector and an iris recognition module in response to an iris recognition-related event being detected.

According to an embodiment of the present disclosure, the electronic device 100 may further include, if user authentication succeeds based on an acquired iris image and a pre-set reference iris image during an iris recognition operation, performing a relevant operation corresponding to a situation in which the iris recognition operation is executed.

According to an embodiment of the present disclosure, executing an iris recognition operation may include determining a trigger to execute the iris recognition operation based on unlocking of an electronic device, selecting a message on a lock screen, or inputting authentication information for user authentication using the electronic device.

According to an embodiment of the present disclosure, the electronic device 100 may further include determining proximity of an object based on a proximity detector prior to executing an iris recognition operation; and determining whether the object satisfies an execution condition for executing the iris recognition operation based on a result of determining whether the object satisfies the execution condition.

According to an embodiment of the present disclosure, determining whether an object satisfies an execution condition may include if the execution condition is not satisfied based on a result of determining whether the object satisfies the execution condition, outputting a first guide; if the execution condition is satisfied, executing an iris recognition operation; and, while performing the iris recognition operation, determining whether the object satisfies a stopping condition for stopping the iris recognition operation.

According to an embodiment of the present disclosure, the electronic device 100 may further include determining whether to re-execute an iris recognition operation in response to the iris recognition operation being stopped; and determining whether to re-execute the iris recognition operation based on at least a part of a user input, proximity of the object, or a set time.

According to an electronic device and a method of operation thereof according to an embodiment of the present disclosure, the electronic device may provide a proximity sensing-based iris recognition function. An electronic device may identify proximity of a user during an iris recognition operation, and adaptively stop and guide the iris recognition operation according to the proximity of the user. An electronic device may automatically track a state of a user (for example, proximity) while the user is using iris authentication using the electronic device, and may control an iris recognition operation, and may intuitively protect the user's eyes and guide the user in real time.

According to an embodiment of the present disclosure, a health care service may be provided by inducing a user to protect the user's eyes if the user authenticates the user's irises using the electronic device. In a case of an electronic device (for example, a head-mounted display (HDM)) which has a screen brought into relatively close proximity to a user's eyes, light generated during the iris recognition operation may be prevented from harmfully influencing eye health in advance. The usability, convenience, and competitiveness of the electronic device may be enhanced.

While certain embodiments of the present disclosure are described above, various changes may be made without departing from the scope of the present disclosure. Therefore, the scope of the present disclosure is not intended to be limited to or defined by the above-described embodiments, but is defined by the appended claims and their equivalents.

What is claimed is:

1. An electronic device, comprising:
   a proximity sensor;
   an infra-red (IR) camera unit;
   a memory; and
   a processor electrically connected to the proximity sensor, the IR camera unit, and the memory, wherein the processor is configured to:
   control the proximity sensor to detect a first proximity of an object related to an iris recognition operation prior to executing the iris recognition operation;
   determine whether the object satisfies an execution condition for executing the iris recognition operation based on the detected first proximity of the object;
   in response to the object satisfying the execution condition, execute the iris recognition operation using IR light emitted from the IR camera unit;
   control the proximity sensor to detect a second proximity of the object while the iris recognition operation is performed;
   in response to the second proximity of the object being within a set reference range, stop emitting the IR light from the IR camera unit to stop the iris recognition operation;
   maintain a state of the proximity sensor in an active state after the iris recognition operation is stopped; and
   after the iris recognition operation being stopped, re-execute the iris recognition operation based on a user input or a set time.

2. The electronic device of claim 1, wherein, if the proximity sensor determines that the object approaches within the set reference range during the iris recognition operation, the processor is further configured to deactivate the IR camera unit.

3. The electronic device of claim 1, wherein the processor is further configured to output a guide corresponding to stopping the iris recognition operation based on at least a part of a visual, auditory, or tactile method.

4. The electronic device of claim 1, wherein the processor is further configured to drive the proximity sensor and the IR camera unit in response to an iris recognition-related event being detected.

5. The electronic device of claim 1, wherein, if user authentication succeeds based on an acquired iris image and a pre-set reference iris image during the iris recognition operation, the processor is further configured to perform an operation corresponding to a situation in which the iris recognition operation is executed.

6. The electronic device of claim 1, wherein the processor is further configured to determine a trigger to execute the iris recognition operation based on unlocking the electronic device, selecting a message on a lock screen, or inputting authentication information for user authentication using the electronic device.

7. The electronic device of claim 1, wherein the processor is further configured to:
   if the execution condition is not satisfied, output a first guide;
   if the execution condition is satisfied, execute the iris recognition operation; and
   while performing the iris recognition operation, determine whether the object satisfies a stopping condition for stopping the iris recognition operation.

8. A method of operating an electronic device, the method comprising:
   detecting, by a proximity sensor, a first proximity of an object related to an iris recognition operation prior to executing the iris recognition operation;
   determining whether the object satisfies an execution condition for executing the iris recognition operation based on the detected first proximity of the object;
   in response to the object satisfying the execution condition, executing the iris recognition operation using infrared (IR) light emitted from an IR camera unit;
   detecting, by the proximity sensor of the electronic device, a second proximity of the object while the iris recognition operation is performed;
   in response to the second proximity of the object being within a set reference range, stopping emitting the IR light from the IR camera unit to stop the iris recognition operation;
   maintaining a state of the proximity sensor in an active state after the iris recognition operation is stopped; and
   after the iris recognition operation being stopped, re-executing the iris recognition operation based on a user input or a set time.

9. The method of claim 8, further comprising:
   in response to the proximity sensor determining that the object approaches within the set reference range during the iris recognition operation, deactivating the IR camera unit.

10. The method of claim 8, further comprising:
    outputting a guide corresponding to stopping the iris recognition operation based on at least a part of a visual, auditory, or tactile method.

11. The method of claim 8, wherein executing the iris recognition operation comprises driving the proximity sensor and the IR camera unit in response to an iris recognition-related event being detected.

12. The method of claim 8, further comprising, if user authentication succeeds based on an acquired iris image and a pre-set reference iris image during the iris recognition operation, performing an operation corresponding to a situation in which the iris recognition operation is executed.

13. The method of claim 8, wherein executing the iris recognition operation comprises determining a trigger to execute the iris recognition operation based on unlocking of the electronic device, selecting of a message on a lock screen, or inputting authentication information for user authentication using the electronic device.

14. The method of claim 8, wherein determining whether the object satisfies the execution condition comprises:
    if the execution condition is not satisfied based on the result of determining the proximity of the object, outputting a first guide;
    if the execution condition is satisfied, executing the iris recognition operation; and
    while performing the iris recognition operation, determining whether the object satisfies a stopping condition for stopping the iris recognition operation.

* * * * *